United States Statutory Invention Registration [19]

[11] Reg. Number: H567

Nagaoka et al. [43] Published: Jan. 3, 1989

[54] SILVER HALIDE COLOR PHOTOGRAPHIC LIGHT-SENSITIVE MATERIALS CONTAINING CYAN COUPLER AND SPECIFIC COMPOUND

[75] Inventors: Satoshi Nagaoka; Hidetoshi Kobayashi, both of Kanagawa, Japan

[73] Assignee: Fuji Photo Film Co., Ltd., Minami-Ashigara, Japan

[21] Appl. No.: 932,875

[22] Filed: Nov. 20, 1986

[30] Foreign Application Priority Data

Nov. 21, 1985 [JP] Japan ..... 60-259809
Nov. 21, 1985 [JP] Japan ..... 60-259810

[51] Int. Cl.[4] ..... G03C 7/32; G03C 7/34; G03C 7/42

[52] U.S. Cl. ..... 430/372; 430/548; 430/551; 430/552; 430/553

[58] Field of Search ..... 430/551, 553

[56] References Cited

U.S. PATENT DOCUMENTS

| | | | |
|---|---|---|---|
| 4,228,070 | 10/1980 | Milner et al. . | |
| 4,245,018 | 1/1981 | Hara et al. | 430/551 |
| 4,254,212 | 3/1981 | Yagihara et al. . | |
| 4,296,199 | 10/1981 | Yagihara et al. . | |
| 4,332,886 | 6/1982 | Aoki et al. | 430/551 |
| 4,343,886 | 8/1982 | Nakamura et al. | 430/551 |
| 4,360,589 | 11/1982 | Kojima et al. | 430/551 |
| 4,433,050 | 2/1984 | Abe et al. . | |
| 4,517,283 | 5/1985 | Leppard et al. | 430/551 |
| 4,526,864 | 7/1985 | Takada et al. | 430/551 |
| 4,560,645 | 12/1985 | Toriuchi et al. . | |
| 4,590,153 | 5/1986 | Kawagishi et al. . | |
| 4,609,619 | 9/1986 | Katoh et al. | 430/553 |
| 4,631,252 | 12/1986 | Howell | 430/551 |
| 4,690,889 | 9/1987 | Saito et al. | 430/553 |

FOREIGN PATENT DOCUMENTS

| | | |
|---|---|---|
| 106211 | 4/1984 | European Pat. Off. . |
| 161626 | 11/1985 | European Pat. Off. . |
| 8300939 | 3/1983 | PCT Int'l Appl. . |

*Primary Examiner*—John F. Terapane
*Assistant Examiner*—Susan Wolffe
*Attorney, Agent, or Firm*—Birch, Stewart, Kolasch & Birch

[57] ABSTRACT

A silver halide color photographic light sensitive material contains (i) at least one of cyan dye-forming coupler represented by formula (I) and cyan dye-forming couplers derived therefrom (ii) and at least one of compounds represented by formula (II), (III), (V), (VI), (VII) or (VIII) and compounds derived therefrom;

(I)

(II)

(III)

(IV)

(V)

(VI)

(VII)

(Abstract continued on next page.)

20 Claims, No Drawings

-continued

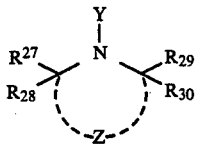

(VIII)

wherein the symbols are defined as in claim 1.

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

SILVER HALIDE COLOR PHOTOGRAPHIC LIGHT-SENSITIVE MATERIALS CONTAINING CYAN COUPLER AND SPECIFIC COMPOUND

FIELD OF THE INVENTION

This invention relates to a silver halide color photographic light-sensitive material and more particularly to a silver halide color photographic light-sensitive material which does not cause the reduction of coloring density even in the case of processing using, in particular, a bleach or blix liquid fatigued or having weak oxidative power. The invention also produces a restrained occurrence of stain by the light exposure of the color photographic material for a long period of time after processing.

BACKGROUND OF THE INVENTION

When a silver halide color photographic light-sensitive material is, after imagewise exposure, color-developed, the dye-forming coupler(s) (hereinafter, referred to as simply coupler) in the light-sensitive material reacts with the oxidation product of an aromatic primary amine developing agent to form color images.

Recently, couplers which are used for silver halide color photographic materials are required to have various properties. For example, the couplers are required to have properties such as excellent stability, processability, coloring property, and hue of the color images formed therefrom. The color images formed therefrom should be fast, able to be produced at low cost and excellent in production qualities, etc.

Hitherto, phenolic couplers and naphtholic couplers have been used as cyan couplers. In particular, 1-naphthol couplers are excellent in color reproduction since the colored dyes formed therefrom have an absorption maximum (λmax) at a long wavelength region and have less side absorption in the green region. In addition 1-naphthol couplers excellent in coloring property can be produced at a low cost and are excellent in production qualities. Thus, such cyan couplers have been widely used for color negative photographic materials.

However, conventional phenolic couplers and naphtholic couplers, in particular 2-alkylcarbamoyl-1-naphtholic couplers have a disadvantage that if a bleach liquid or blix liquid in a bleach step or blix step in a color photographic process is fatigued or has a weak oxidative power, color images having sufficient quality cannot be obtained. This phenomenon is considered to be caused by the reductive fading of cyan dyes by a ferrous ion formed in the bleach or blix step. Also, the cyan images formed from these couplers have a disadvantage of being low in color fastness.

The former disadvantage in naphtholic couplers can be eliminated by changing the substituent of the carbamoyl group at the 2-position from an alkyl group to an aryl group to convert the couplers to 2-arylcarbmoyl-1-naphtholic couplers (as described, for example, in U.S. Pat. No. 3,488,193). However, the latter disadvantage of the couplers has not yet been sufficiently solved and hence it is not always desired from the point of image stability to use only the naphthlic coupler as a cyan coupler in color photographic materials.

On the other hand, in regard to naphtholic couplers, the 1-naphtholic couplers having a specific substituent at the 5-position as disclosed in Japanese Patent Application (OPI) No. 237448/85, and European Patent 161626 (the term "OPI" as used herein means an "unexamined published application") have successfully eliminated the above-described two disadvantages and hence are excellent in performance but also have the following disadvantages. That is, one of the disadvantages is that when a color photographic material containing the coupler is exposed to light for a long period of time after processing, brown coloring or stain is formed. Another disadvantage is that the couplers are insufficient in coloring property and are lacking in aptitude for high-speed light-sensitive materials which have been required recently. In particular, the former disadvantage is a large problem since the stain formed causes the reduction in color reproducibility of the color photographic materials.

SUMMARY OF THE INVENTION

The first object of this invention is to provide a silver halide color photographic material having no reduction of cyan coloring density even when processed with a bleach or blix liquid fatigued or having a weak oxidative power.

The second object of this invention is to provide a silver halide color photographic material having a restrained occurrence of stain by a light-exposure of the color photographic material for a long period of time after processing.

It has now been discovered that the above-described objects can be attained by the silver halide color photographic material of this invention as set forth hereinbelow.

That is, the invention provides a silver halide color photographic light-sensitive material having on a support at least one light-sensitive silver halide emulsion layer, wherein the color photographic light-sensitive material contains (i) at least one cyan dye-forming coupler selected from the group consisting of compounds represented by following formula [I] and a compound having at least two coupler residue derived from the compound represented by formula [I] and (ii) at least one compound selected from the group consisting of compounds represented by formula [II], [III], [IV], [V], [VI], [VII] or VIII] and a compound having at least two residues derived from at least one compound selected from the same group:

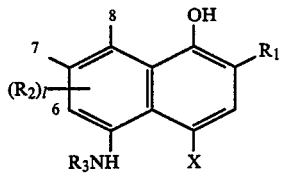

[I]

wherein, $R_1$ represents $—CONR_6R_7$, $—NHCOR_6$, $—NHCOOR_8$, $—NHSO_2R_8$, $—NHCONR_6R_7$, or $—NHSO_2NR_6R_7$ (wherein, $R_6$ and $R_7$, which may be the same or different, each represents a hydrogen atom, an aliphatic group, an aromatic group, or a heterocyclic group and $R_8$ represents an aliphatic group, an aromatic group, or a heterocyclic group), $R_2$ represents a group capable of being substituted to a naphthalene ring; l represents an integer of from 0 to 3; $R_3$ represents a mono-valent group: and X represents a hydrogen atom or a group capable of releasing by a coupling reaction with the oxidation product of an aromatic primary amine developing agent. When l is 2 or 3 the $R_2$ groups may be the same or different or they may further combine with each other to form a ring when they are adjacent to each other. Also, said $R_2$ and $R_3$ groups or said $R_3$ and X groups may combine with each other to form a ring when $R_2$ is present at 6-position.

The compounds of formulae [II]-[V] are represented by the folowing structures:

[II]

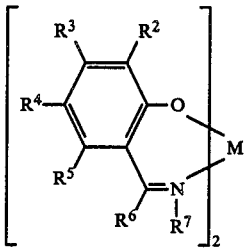

[III]

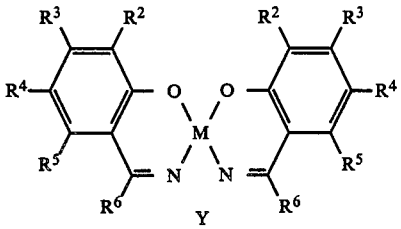

[IV]

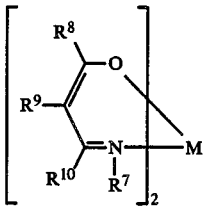

[V]

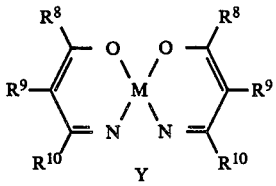

wherein

M represents Cu, Co, Ni, Pd, or Pt; $R^2$, $R^3$, $R^4$, and $R^5$ each represents a hydrogen atom, a halogen atom, a hydroxy group, a cyano group, an alkyl group, aryl group, cycloalkyl group, or heterocyclic group bonded to the carbon atom of the benzene ring directly or through a divalent linkage group, or a non-metallic atomic group necessary for forming a 6-membered ring by the combination of said $R^2$ and $R^3$, said $R^3$ and $R^4$, or said $R^4$ and $R^5$ with each other;

$R^6$, $R^9$, and $R^{10}$ each represents a hydrogen atom, an alkyl group, or an aryl group;

$R^7$ represents a hydrogen atom, an alkyl group, an aryl group, or a hydroxy group:

$R^8$ represents an alkyl group, an aryl group, or a non-metallic atomic group necessary for forming a 5-membered to 8-membered ring by the combination of said $R^8$ and $R^9$ or $R^9$ and $R^{10}$ with each other; and Y represents a non-metallic atomic group necessary for forming a 5-membered ring or a 6-membered ring.

The compounds of formulae [VI]- [VIII] are represented by the following structures:

(VI)

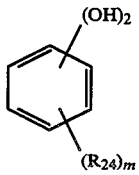

(VII)

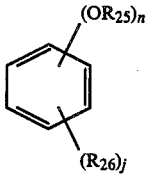

(VIII)

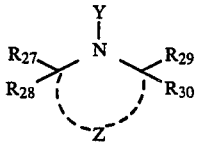

wherein, $R_{24}$ represents an aliphatic group, an aromatic group, a heterocyclic group an aliphatic oxy group, an aromatic oxy group, an aliphatic thio group, an aromatic thio group, an aliphatic carbonamido group, an aromatic carbonamido group, an aliphatic sulfonamido group, an aromatic sulfonamido group, a mono-substituted or disubstituted amino group with aliphatic or aronatic groups, and m represents an integer of 1 to 4. When said m is plural, said $R_{24}$ groups may be the same or different or may combine with each other to form a ring when they are adjacent to each other. The two hydroxy groups are para-position or ortho-position relative to each other.

$R_{25}$ represents an aliphatic group, an aromatic group, a heterocyclic group, or a substitued silyl group; $R_{26}$ has the same significance as defined above for $R_{24}$ in formula [VI]; n represents an integer of 1 to 3; and j represents an integer of 0 to 5, the sum of n and j being, however, 6 or less. When n is plural, said $OR_{25}$ groups may be the same or different. When said j is plural, said $R_{26}$ groups may be the same or different, and when said two $OR_{25}$ groups, said two $R_{26}$ groups, or said $OR_{25}$ and $R_{26}$ are in a ortho-position relative to each other, they may combine with each other to form a ring.

$R_{27}$, $R_{28}$, $R_{29}$, and $R_{30}$ each represents a hydrogen atom or an aliphatic group; Y represents a hydrogen atom, an aliphatic group, an acyl group, an aliphatic sulfonayl group, an aromatic sulfonyl group, an aliphatic sulfinyl group, an aromatic sulfinyl group, an aliphatic oxycarbonyl group, an aromatic oxycarbonyl group, an oxyradical group, or a hydroxy group; and Z represents a non-metallic atomic group necessary for forming a 5-membered to 7-membered ring with

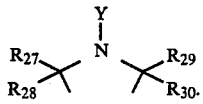

$OR_{25}$ and $R_{26}$ in formula VII may be present at any position on the benzene ring.

In the present invention an aliphatic group, an aromatic group and a heterocyclic group are defined as below unless they are defined specifically.

The aliphatic group preferably has from 1 to 32 carbon atoms and may be a saturated or unsaturated, substituted or unsubstituted, or straight chain, branched or cyclic alkyl, alkenyl or alkynyl group. Specific examples of an aliphatic group include a methyl group, an ethyl group, a butyl group, a cyclohexyl group, an allyl group, a t-butyl group, a 1,1-dimethylpropyl group, a 1,1-dimethylbutyl group, a 1,1,3,3-tetramethylbutyl group, a 2-hexyl group, a 2-decyl group, a 2-ethylhexyl group, a 3,5,5-trimethylhexyl group, a 2-dodecyl group, a 2-hexyl group, a 2-hexyldecyl group, a 9-octadecenyl group, a butoxy-ethyl group, a benzyl group, a phenetyl group, a 3-dodecyl-oxypropyl group, a 3-decyloxypropyl group, a 3-dodecylthiopropyl group, a propargyl group, a methoxyethyl group, an n-decyl group, an n-dodecyl group, an n-hexadecyl group, a trifluoromethyl group, a heptafluoropropyl group, a dodecyloxypropyl group, a 2,4-di-tert-amylphenoxypropyl group, a 2,4-di-tert-amylphenoxybutyl group, etc.

The aromatic group in this invention preferably has from 6 to 32 carbon atoms and may be a substituted or unsubstituted aromatic group and includes, for example, a phenyl group, a tolyl group, a 2-tetradecyloxyphenyl group, a pentafluorophenyl group, a 2-chloro-5-dodecyloxycarbonylphenyl group, a 4-chlorophenyl group, a 4-cyanophenyl group, a 4-hydroxyphenyl group, etc.

The heterocyclic group in this invention is a 5–7 membered heterocylcic group having at least one of N, O and S atom as a hetero atom and may be a substituted or unsubstituted. Examples of heterocyclic group include a 2-pyridyl group, a 4-pyridyl group, a 2-furyl group, a 4-thienyl group, a quinolinyl group, etc.

Examples of substituents for the above described aliphatic, aromatic and heterocyclic group are those which are commonly used for such a group, that is, a halogen atom, a nitro group, a cyano group, an acyl group, an acyloxy group, an alkyl or aryl sulfonyl group, a hydroxy group, an amido group, an amino group (may be mono- or di-substituted with an aliphatic or aromatic group), an alkyl group, an alkenyl group and aryl group (hereinafter these substituents are referred to as substituents A).

The substituents $R_1$, $R_2$, $R_3$ and X in formula [I] described above are explained herein below in detail.

$R_1$ in formula [I] represents $—CONR_6R_7$, $—NHCOR_6$, $—NHCOOR_8$, $—NHSO_2R_8$, $—NHCONR_6R_7$, or $—NHSO_2NR_6R_7$. Examples of $R_6$, $R_7$, and $R_8$ groups include an aliphatic group having 1 to 30 carbon atoms, an aromatic group having 6 to 30 carbon atoms, and a heterocyclic group having 2 to 30 carbon atoms. The $R_6$ and $R_7$ groups each may be a hydrogen atom.

$R_2$ represents a group or an atom substitutable to the naphthalene ring, such as a halogen atom, a hydroxy group, $—NR_6'R_7'$, a carboxy group, a sulfonic acid group, a cyano group, an aliphatic group, an aromatic group, a heterocyclic group, $—NHCOR_6'$, $—NHSO_2R_6'$, $—CONR_6'R_7'$, $—SO_2NR_6'R_7'$, $—NHCONR_6'R_7'$, $—COR_6'$, $—OCR_6'$,$—OR_8'$, $—SR_8—SO_2R_8'$, $—NHSO_2NR_6R_7$, a nitro group, an acid imido group, etc., wherein $R_6'$, $R_7'$ and $R_8'$ have the same meaning as defined for $R_6$, $R_7$ and $R_8$, respectively. The carbon number included in $R_2$ is from 0 to 30. When l=2, as examples of a $R_2$ group which forms a ring includes a dioxymethylene group, etc.

$R_3$ represents a mono-valent group and is preferably shown by following formula [IX]:

$$R_9(Y_1)_n— \quad [IX]$$

wherein, $Y_1$ represents >NH,>Co, or $>SO_2$, n represents 0 or 1; and $R_9$ represents a hydrogen atom, an aliphatic group having 1 to 30 carbon atoms, an aromatic group having 6 to 30 carbon atoms, a heterocyclic group having 2 to 30 carbon atoms, $—OR_{10}$, $—COR_{10}$,

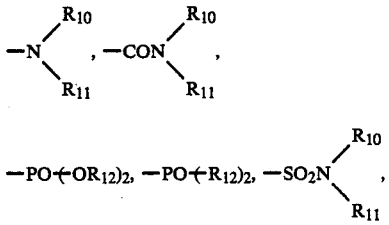

$—CO_2R_{12}$, $—SO_2R_{12}$, or $—SO_2OR_{12}$ (wherein, $R_{10}$, $R_{11}$, and $R_{12}$ have the same meaning as defined above in $R_6$, $R_7$, and $R_8$, respectively).

Also, $R_6$ and $R_7$ of

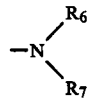

in $R_1$, $R_6'$ and $R_7'$ of

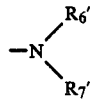

in $R_2$, and $R_{10}$ and $R_{11}$ of

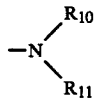

in $R_9$ may combine with each other to form a nitrogen-containing heterocyclic ring (e.g., a morpholine ring, piperidine ring, pyrrolodine ring, etc.).

X in formula [I]described above represents a hydrogen atom or a coupling releasing group (including releasing atom). Specific examples of the coupling releasing group include a halogen atom, $—OR_{13}$, $—SR_{13}$, $$—\underset{\underset{O}{\|}}{C}R_{13} \quad —NHCOR_{13}, \quad —NH\underset{\underset{O}{\|}}{C}SR_{13}, \quad —O\underset{\underset{O}{\|}}{C}—OR_{13}, \quad —O\underset{\underset{O}{\|}}{C}NHR_{13}$$

(wherein, $R_{13}$ represents an aliphatic group having 1 to 30 carbon atoms, an aromatic group having 6 to 30 carbon atoms, or a heterocyclic group having 2 to 30 carobn atoms), an aromatic azo group having 6 to 30 carbon atoms, a heterocyclic group having 2 to 30 carbon atoms (e.g., succinic acid imido group, a phthalic acid imido group, a hydantoinyl group, a pyrazoline group, a 2-benzotriazolyl group, etc.) bonded to the coupling active position of the coupler by a nitrogen atom, etc.

Preferred substituents $R_1$, $R_2$, $R_3$ and X for the cyan couplers shown in formula [I] described above are explained in detail hereinbelow.

$R_1$ in formula [I] is preferably —$CONR_6R_7$ and includes, preferably, a carbamoyl group, an ethylcarbamoyl group, a morpholinocarbonyl group, a dodecylcarbamoyl group, a hexadecylcarbamoyl group, a decyloxypropylcarbamoyl group, a dodecyloxypropylcarbamoyl group, a 2,4-di-tert-amylphenoxypropylcarbamoyl group, a 2,4-di-tert-amylphenoxybutylcarbamoyl group, etc.

Regarding $R_2$ and l, it is most preferred that l is 0 and $R_2$, if any, is preferably a halogen atom (F, Cl, Br or I), an aliphatic group, a carbonamido group, a sulfonamido group, etc.

Preferably $R_3$ in formula [I] is when n in formula [IX] described above is 0 and also $R_9$ in formula [IX] is —$COR_{10}$ (such as a formyl group, an acetyl group, a trifluoroacetyl group, a chloroacetyl group, a benzoyl group, a pentafluorobenzyl group, a pchlorobenzoyl group, etc.), —$COOR_{12}$ (e g., a methoxycarbonyl group, an ethoxycarbonyl group, a butoxycarbonyl group, a decyloxycarbonyl group, a methoxyethoxycarbonyl group, a phenoxycarbonyl group, etc.), —$SO_2R_{12}$ (e.g., a methanesulfonyl group, an ethanesulfonyl group, a butanesulfonyl group, a hexadecanesulfonyl group, a benzenesulfonyl group, a toluenesulfonyl group, a p-chlorobenzenesulfonyl group, etc.), —$CONR_{10}R_{11}$ (e.g., an N,N-dimethylcarbamoyl group, an N,N-diethylcarbamoyl group, an N,N-dibutylcarbamoyl group, a morpholinocarbonyl group, a piperidinocarbamoyl group, a 4-cyanophenylcarbamoyl group, a 3,4-dichlorophenylcarbamoyl group, a 4-methanesulfonylphenylcarbamoyl group, etc.), —$SO_2NR_{10}OR_{11}$ (an N,N-dimethylsulfamoyl group, an N,N-diethylsulfamoyl group, an N,N-dipropylsulfamoyl group, etc.), etc. $R_3$ in formula [I] is more preferably —$COOR_{12}$, —$COR_{10}$, or $SO_2R_{12}$ and is most preferably —$COOR_{12}$.

X in formula [I] is preferably a hydrogen atom, a chlorine atom, an aliphatic oxy group (e.g., a 2-hydroxyethoxy group, a 2-chloroethoxy group, a carboxymethyloxy group, a 1-carboxyethoxy group, a 2-methanesulfonylethoxy group, a 3-carboxypropyloxy group, a 2-methoxyethoxycarbamoylmethloxy group, a 1-carboxytridecyloxy group, a 2-(1-carboxytridecylthio)ethyloxy group, a 2-carboxymethylthioethyloxy group, a 2-methanesulfonamidoethyloxy group, etc.), an aromatic oxy group (e.g., a 4-acetamidophenoxy group, a 2-acetamidophenoxy group, a 4-(3-carboxypropaneamido)phenoxy group. etc.), or a carbamoyloxy group (e.g., an ethylcarbamoyloxy group, a phenylcarbamoyloxy group, etc.).

Examples of the compound having at least two coupler residues derived from the compound represented by formula [I] include bis-, tris-, tetrakis compound, an oligomer (polymerization degree: not more than 99) and a polymer (polymerization degree: at least 100). (Hereinafter the oligomer and the polymer are referred to as a polymer.)

The bis-, tris- and tetrakis compound may be formed by combining with each other through a divalent group or a group having a higher valent at said $R_1$, $R_2$, $R_3$, or X. When the coupler of the present invention is a polymer, the polymer is a homopolymer or copolymer of an addition polymerizable ethylenically unsaturated compound (cyan-coloring monomer) having the cyan-dye forming coupler residue derived from the compound represented by formula [I]. In this case, the polymer may contain therein at least one type of recurring unit represented by formula [X] described below or may be a copolymer containing at least one type of cyan coloring recurring unit shown by formula [X] below and at least one type of non-coloring ethylenic monomer.

Formula X is represented by the following structure:

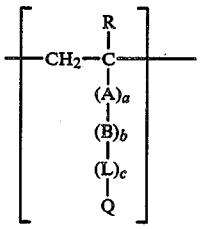

[X]

wherein, R represents a hydrogen atom, an alkyl group having 1 to 4 carbon atoms or a chlorine atom; A represents —CONH—, —COO—, or a substituted or unsubstituted phenylene group; B represents a substituted or unsubstituted alkylene group (having preferably from 1 to 10 carbon atoms), a substituted or unsubstituted phenylene group, or a substituted or unsubstituted aralkylene group (having preferably from 7 to 20 carbon atoms); L represents —CONH—, —NHCONH—, —NHCOO—, —NHCO—, —OCONH—, —NH—, —COO—, —OCO—, —CO—, —O—, —$SO_2$—, —$NHSO_2$—, or —$SO_2NH$—; a, b, and c each represents 0 or 1; Q represents a cyan coupler residue formed by the release of a hydrogen atom other than the hydrogen atom of the hydroxy group at the 1-position of the compound shown by formula [I] described above or preferably a cyan coupler residue formed by the release of one hydrogen atom from the substituent $R_1$, $R_2$, $R_3$, or X of the compound shown by formula [I]. Examples of substituents for above-described groups include the same as substituents A described hereinabove.

The preferred polymer is a copolymer of a cyan coloring monomer forming a coupler unit shown by formula [X] described above and the non-coloring ethylenical monomer described below.

That is, as the non-coloring ethylenical monomer which does not cause a coupling reaction with the oxidation product of an aromatic primary amine developing agent, there are acrylic acid, α-chloroacrylic acid, α-alkylacrylic acid (e.g., methacrylic acid, etc.). the esters or amides derived from these acrylic acids (e.g., acrylamide, methacrylamide, n-butylacrylamide, t-butylacrylamide, diacetoneacrylamide, methylacrylate, ethylacrylate, n-isobutyl acrylate, 2-ethylhexyl acrylate, n-octyl acrylate, lauryl acrylate, methyl methacrylate, ethyl methacrylate, n-butylmethacrylate, and β-hydroxy methacrylate), vinyl esters (e.g., vinylacetate, vinylpropionate, and vinyllaurate), acrylonitrile, methacrylonitrile, aromatic vinyl compounds (e.g., styrene and the derivatives thereof, such as vinyltoluene, divinylbenzene, vinylacetophenone, and sulfostyrene), itaconic acid, citraconic acid, crotonic acid, vinylidene chloride, vinyl alkyl ethers (e.g., vinyl ethyl ether, etc.), maleic acid esters, N-vinyl-2-pyrrolidone, N-vinylpyridine, and 2- and 4-vinylpyridines.

In the above-described monomers, acrylic acid esters, methacrylic acid esters, and maleic acid esters are particularly preferred. The above-described non-coloring ethylenical monomers may be used solely or as a mixture thereof, such as a mixture of methyl acrylate and butyl acrylate, butyl acrylate and styrene, butyl methacrylate and methacrylic acid, or methyl acrylate and diacetoneacrylamide.

The ethylenically unsaturated monomer to be copolymerized with the vinyl monomer corresponding to formula [X] described above may be selected so that, as is well known in the field of polymer couplers, the copolymer formed would have good chemical and/or physical properties such as solubility, compatibility with a binder for the photograpiic colloid compositions such as gelatin, flexibility of the binder, heat stability thereof, etc.

The cyan polymer coupler may be used in the present invention by dissolving an oleophilic polymer coupler obtained by polymerizing the vinyl monomer giving the coupler unit represented by formula [X] described above in an organic solvent and then dispersing in an aqueous gelatin solution to form a latex or it may be used by directly forming a latex by an emulsion polymerization of the vinyl monomer.

In this case, the oleophilic polymer coupler may be dispersed in an aqueous gelatin solution in the form of a latex by the method described in U.S. Pat. No. 3,451,820. Alternatively, the emulsion polymerization can be performed using the methods described in U.S. Pat. Nos. 4,080,211 and 3,370,952.

Specific examples of the cyan coupler represented by formula [I] are illustrated below, however, the invention is not limited to these specific compounds. In addition, $(t)C_5H_{11}$ in the following formulae represents $-C(CH_3)_2C_2H_5$ and (t) $C_8H_{17}$ represents $-C(CH_3)_2CH_2C(CH_3)_3$.

(I-1)

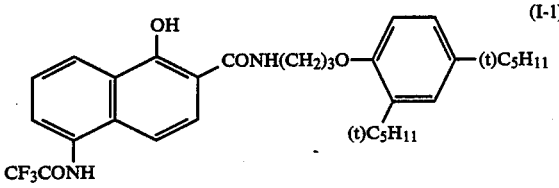

(I-2)

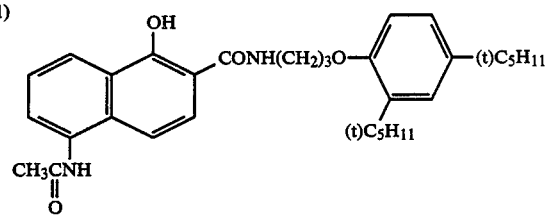

(I-3)

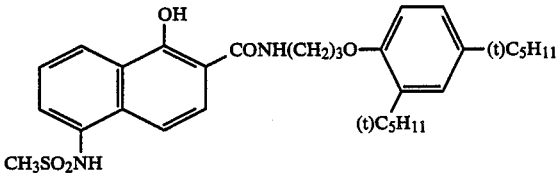

(I-4)

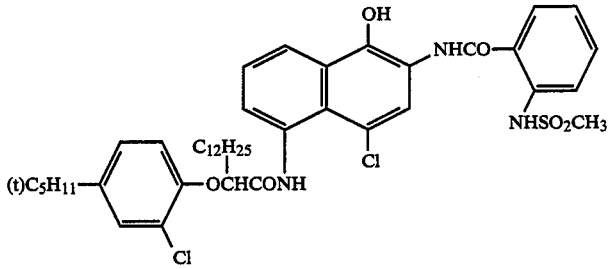

(I-5)

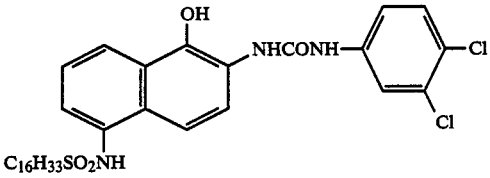

(I-6)

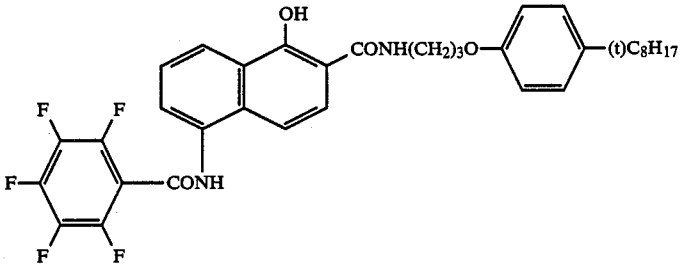

-continued
(I-7)
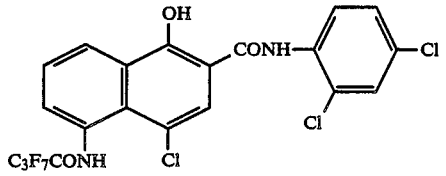
(I-8)
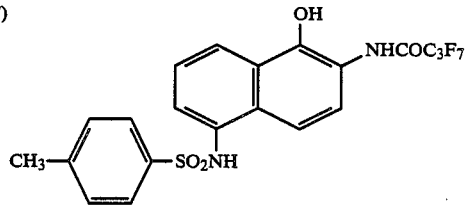
(I-9)
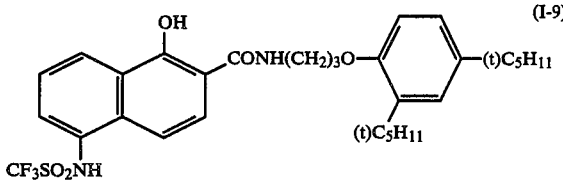
(I-10)
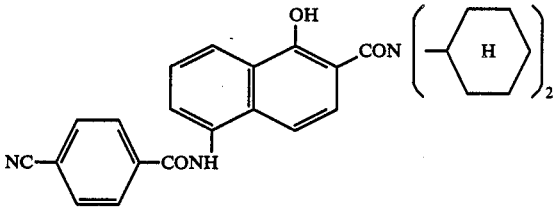
(I-11)
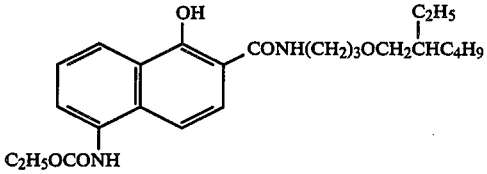
(I-12)
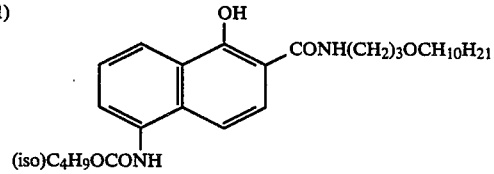
(I-13)
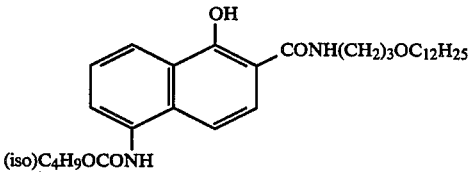
(I-14)
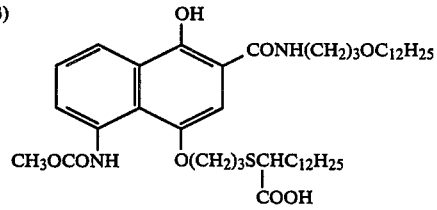
(I-15)
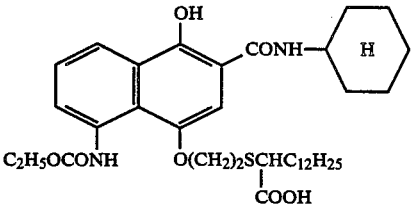
(I-16)
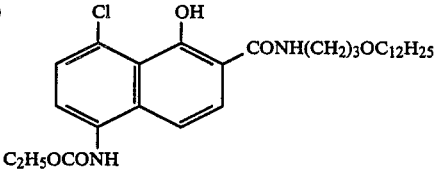
(I-17)
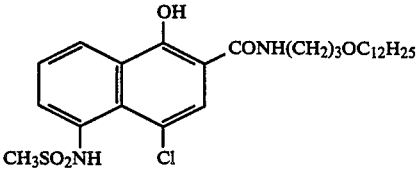
(I-18)
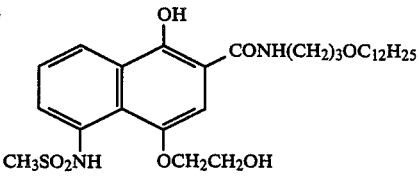
(I-19)
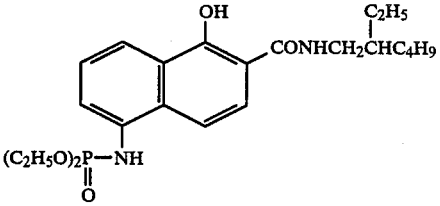
(I-20)
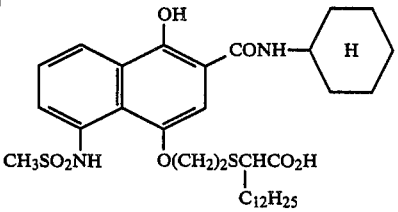

-continued
(I-21)
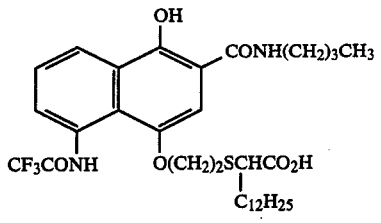
(I-22)
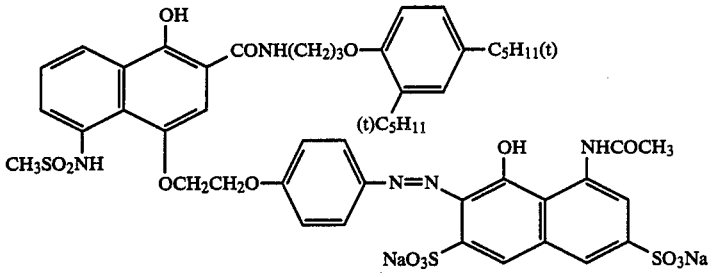
(I-23)
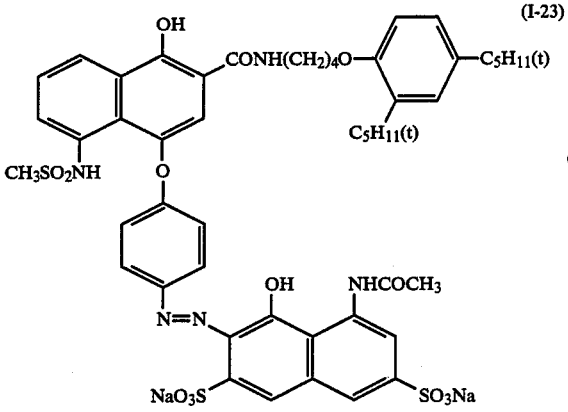
(I-24)
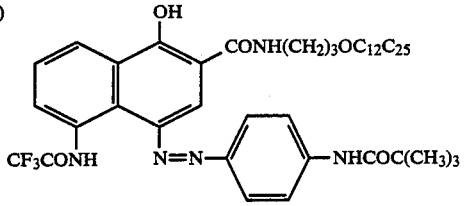
(I-25)
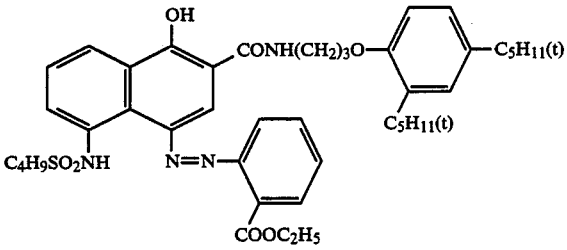
(I-26)
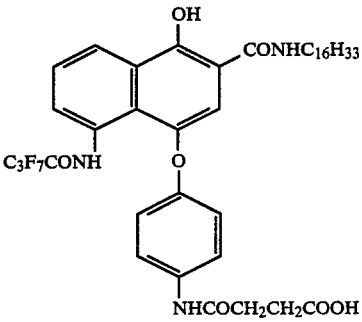

-continued
(I-27)
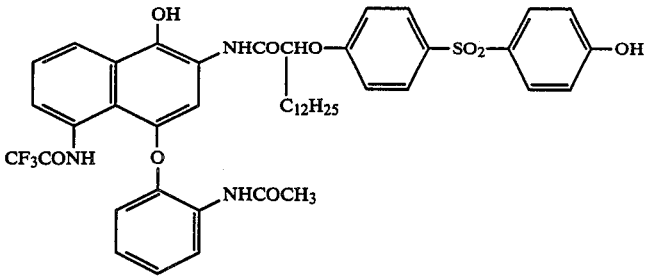
(I-28)
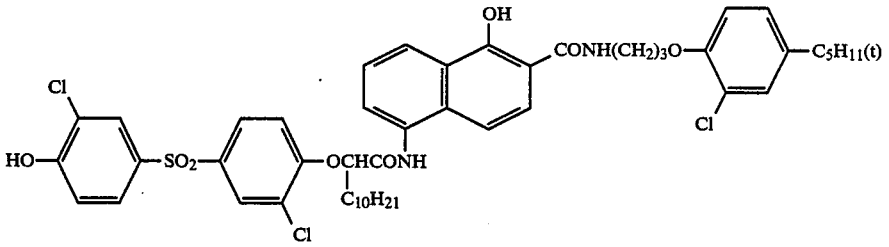
(I-29)
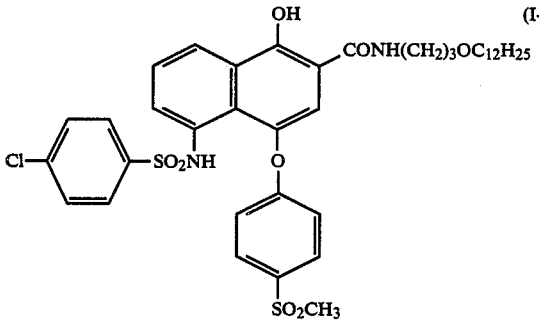
(I-30)
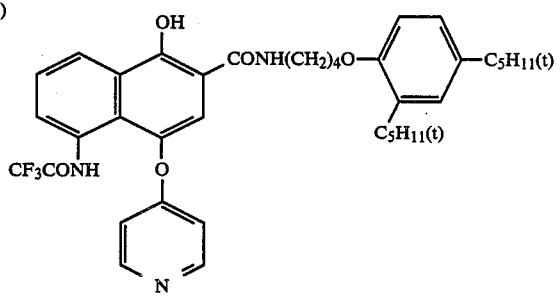
(I-31)
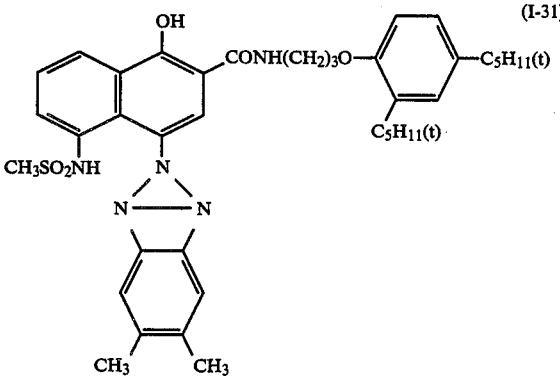
(I-32)
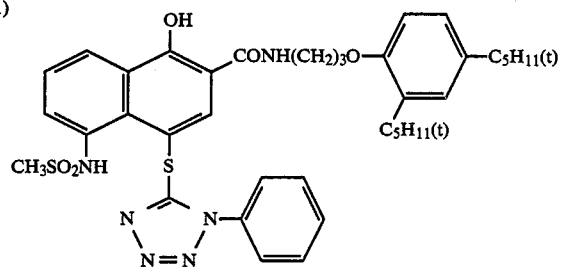
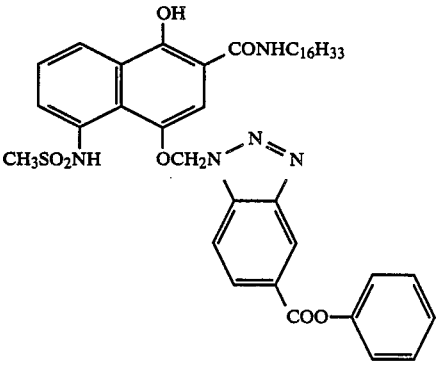
(I-33)
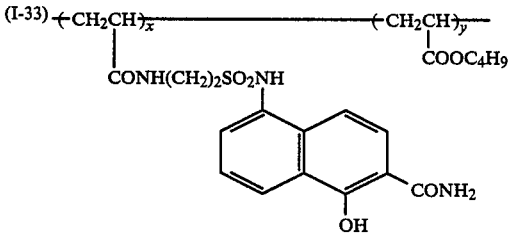
x:y = 80:20
(molar ratio)
(I-34)

-continued
(I-35)
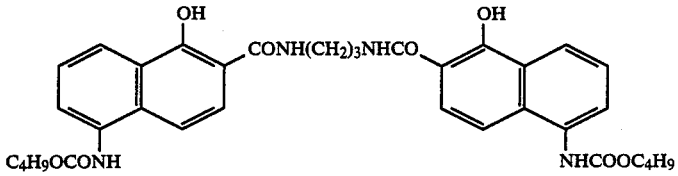
(I-36)
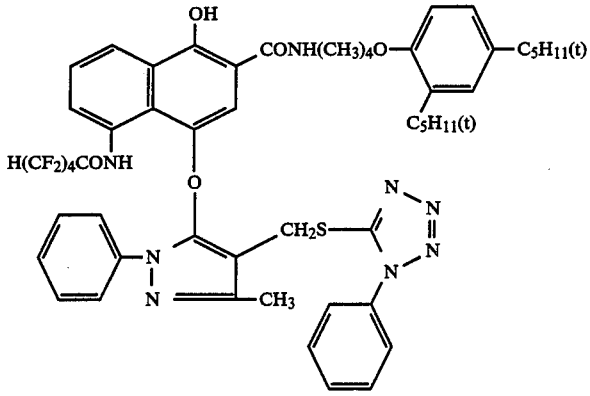
(I-37)
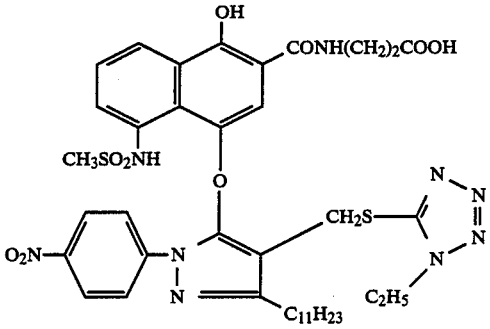
(I-38)
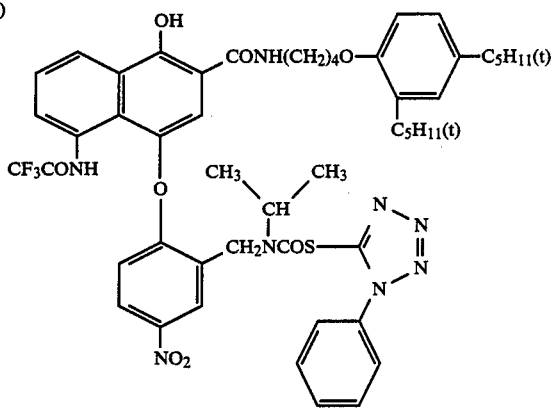
(I-39)
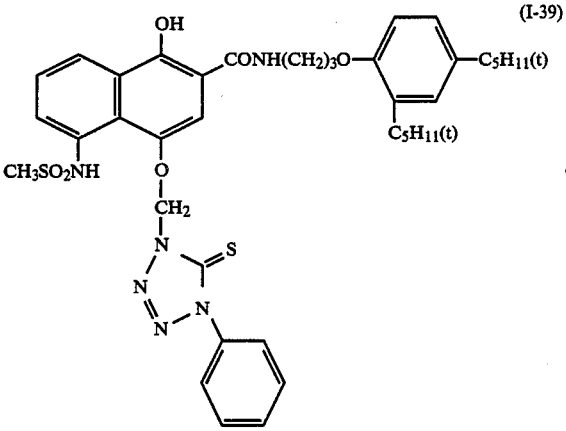
(I-40)
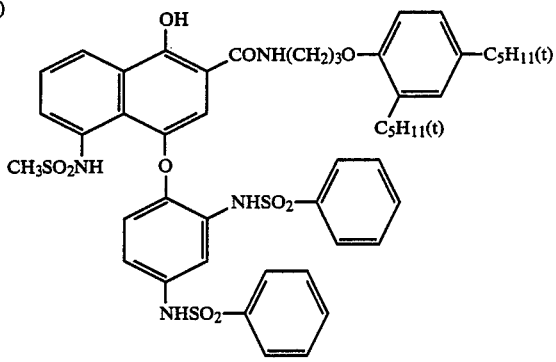
(I-41)
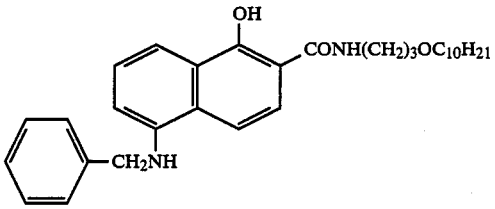

-continued (I-42)

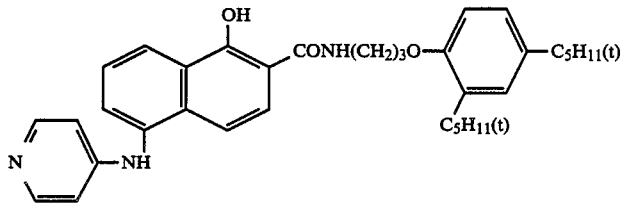

(I-43)

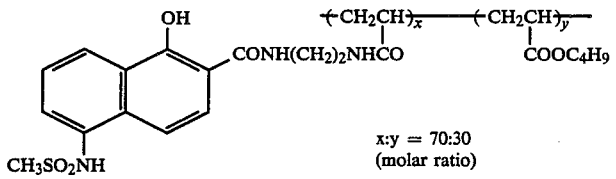

x:y = 70:30
(molar ratio)

(I-44)

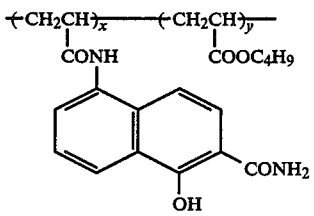

x:y = 50:50
(molar ratio)

(I-45)

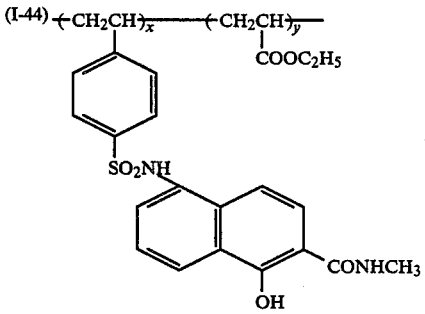

x:y = 60:40
(molar ratio)

The cyan couplers which are those represented by formula [I] described above and the above described derivatives thereof, can be preprared by the methods described, for example, in Japanese Patent Application (OPI) No. 237448/85 and European Pat. No. 161626.

The cyan coupler(s) are dissolved in a high-boiling organic solvent such as a phthalic acid ester having 16 to 32 carbon atoms or a phosphoric acid ester and, if desired, additionally using ethyl acetate, etc. The solution is dispersed by emulsification in an aqueous medium.

The cyan coupler used in the present invention may be added to a light-sensitive silver halide emulsion layer or a layer adjacent thereto, however it is preferable to add to a red-sensitive silver halide emulsion layer.

In this invention, the above described cyan coupler may be, if desired, used together with a conventional cyan coupler(s) in an amount preferably of not more than 40 mol %, more preferably of not more than 20 mol % based on.the total amount of cyan couplers. The total amount added of the cyan coupler(s) is preferably from 0.002 to 0.3 mol pre mol of the light-sensitive silver halide in the photographic emulsion layer.

Metal complexes represented by formulae [II] to [V] described above are explained below in detail.

The halogen atom shown by $R^2$, $R^3$, $R^4$, and $R^5$ includes a fluorine atom, a chlorine atom, a bromine atom. and an iodine atom.

The alkyl group shown by $R^2$, $R^3$, $R^4$, and $R^5$ is preferably an alkyl group having 1 to 19 carbon atoms. The alkyl group may be a straight chain or branched alkyl group and also a substituted or unsubstituted alkyl group.

The aryl group shown by $R^2$, $R^3$, $R^4$, and $R^5$ is preferably an aryl group having 6 to 14 carbon atoms and may be substituted or unsubstituted.

The heterocyclic group shown by $R^2$, $R^3$, $R^4$, and $R^5$ is preferably a 5-membered or 6-membered heterocyclic ring and may be substituted or unsubstituted.

The cycloalkyl group shown by $R^2$, $R^3$, $R^4$, and $R^5$ is preferably a 5-membered or 6-membered cycloalkyl group and may be substituted or unsubstituted.

The 6-membered ring which is formed by the combination of said $R^2$ and $R^3$, said $R^3$ and $R^4$, or said $R^4$ and $R^5$ is preferably a benzene ring and may be substituted or unsubstituted or may be condensed.

The straight chain or branched alkyl group shown by $R^2$, $R^3$, $R^4$, and $R^5$ includes, for example, a methyl group, an ethyl group, a propyl group, a butyl group, a hexyl group, an octyl group, a decyl group, a dodecyl group, a tetradecyl group, a hexadecyl group, an octadecyl group, etc.

The aryl group shown by $R^2$, $R^3$, $R^4$, and $R^5$ includes a phenyl group, a naphthyl group, etc.

The heterocyclic group shown by $R^2$, $R^3$, $R^4$, and $R^5$ is a 5-membered or 6-membered heterocyclic ring having at least one nitrogen atom, oxygen atom, or sulfur atom in the ring as a hetero atom and includes, for example, a furyl group, a hydrofuryl group, a thienyl group, a pyrrolyl group, a pyrrolidyl group, a pyridyl group, an imidazolyl group, a pyrazolyl group, a quinolyl group, an indolyl group, an oxazolyl group, a thiazolyl group, etc.

The cycloalkyl group shown by $R^2$, $R^3$, $R^4$, and $R^5$ includes, for example, a cyclopentyl group, a cyclohexyl group, a cyclohexenyl group, a cyclohexadienyl group, etc.

The 6-membered ring formed by the combination of said $R^2$ and $R^3$, said $R^3$ and $R^4$, or said $R^4$ and $R^5$ with each other includes, for example, a benzene ring, a naphthalene ring, an isobenzthiophene ring, an isobenzofuran ring, an isoindoline ring, etc.

The alkyl group, cycloalkyl group, aryl group or heterocyclic group shown by said $R^2$, $R^3$, $R^4$, and $R^5$ may bonded to a carbon atom of the benzene ring through a divalent linkage group such as, for example, an oxy group (—O—), a thio group (—S—), an —NH—, an oxycarbonyl group, a carbonyl group, —NHCO—, —$NHSO_2$—, a carbonylamino group, a sulfonyl group, or a carbonyloxy group.

Examples of an alkyl group shown by said $R^2$, $R^3$. $R^4$, and $R^5$ which is bonded to a carbon atom of the benzene ring through a divalent linkage group include an alkoxy group (e.g., a methoxy group, an ethoxy group, a butoxy group, a propoxy group, an n-decyloxy group, an n-dodecyloxy group, an n-hexadecyloxy group, etc.), an alkoxycarbonyl group (e.g., a methoxycarbonyl group, an ethoxycarbonyl group, a butoxycarbonyl group, an n-decyloxycarbonyl group, an n-hexadecyloxycarbonyl group, etc.), an acyl group (e.g., an acetyl group, a valeryl group, a stearoyl group, a benzoyl group, a toluoyl group, etc.), an acyloxy group (e.g., an acetoxy group, a hexadecylcarbonyloxy group, etc.), an alkylamino group (e.g.. an n-butylamino group, an N,N-diethylamino group, an N,N-didecylamino group, etc.), an alkylcarbamoyl group (e.g., a butylcarbamoyl group, an N,N-diethylcarbamoyl group, an n-dodecylcarbamoyl group, etc.), an alkylsulfamoyl group (e.g., a butylsulfamoyl group, an N,N-diethylsulfamoyl group, an n-dodecylsulfamoyl group, etc.,), an alkylsulfonylamino group (e.g., methylsulfonylamino group, a butylsulfonylamino group, etc.), an alkyl sulfonyl group (e.g., a mesyl group, an ethanesulfonyl group, etc.), an acylamino group (e.g., an acetylamino group, a valerylamino group, a palmitoylamino group, etc.), etc.

Examples of a cycloalkyl group shown by said $R^2$, $R^3$, $R^4$, and $R^5$ which is bonded to a carbon atom of the benzene ring through the above-described divalent linkage group include a cyclohexyloxy group, a cyclohexylcarbonyl group, a cyclohexyloxycarbonyl group, a cyclohexylamino group, a cyclohexenylcarbonyl group, a cyclohexenyloxy group, etc.

Also, examples of an aryl group shown by said $R^2$, $R^3$, $R^4$ and $R^5$ which is bonded to a carbon atom of the benzene ring through the above-described divalent linkage group include an aryloxy group (e.g., a phenoxy group, a naphthoxy group, etc.), an aryloxycarbonyl group (e.g., a phenoxycarbonyl group, a naphthoxycarbonyl group, etc.), an acyl group (e.g., a benzoyl group, a naphthoyl group, etc.), an anilino group (e.g., a phenylamino group, an N-methylanilino group, an N-acetylanilino group, etc.), an acyloxy group (e.g., a benzoyloxy group, a toluoyloxy group, etc.), an arylcarbamoyl group (e.g., a phenylcarbamoyl group, etc.), an arylsulfamoyl group (e.g., a phenylsulfamoyl group, etc.), an arylsulfonylamino group (a phenylsulfonylamino group, a p-tolylsulfonylamino group, etc.), an arylsulfonyl group (a benzenesulfonyl group, a tosyl group, etc.), an acylamino group (e.g., a benzoylamino group, a toluoylamino group, etc.), etc.

Furthermore, the alkyl group, the aryl group, the heterocyclic group, the cycloalkyl group shown by aforesaid $R^2$, $R^3$, $R^4$, and $R^5$ or the 6-membered ring formed by the combination of said $R^2$ and $R^3$, said $R^3$ and $R^4$, or said $R^4$ and $R^5$ may be substituted by a substituent. Examples of substituents are described below (these substituents may be further substituted with substituents A shown herein above).

The Examples include a halogen atom (e.g., chlorine atom, bromine atom, fluorine atom, etc.), a cyano group, a straight chain or branched substituted or unsubstituted alkyl group (e.g., a methyl group, an ethyl group, a propyl group, a butyl group, a hexyl group, an octyl group, a decyl group, a dodecyl group, a tetradecyl group, a hexadecyl group, a heptadecyl group, an octadecyl group, a methoxyethoxyethyl group, etc.), an aryl group (e.g., a phenyl group, a tolyl group, a naphthyl group, a chlorophenyl group, a methoxyphenyl group, an acetylphenyl group, etc.), an alkoxy group (e.g., a methoxy group, an ethoxy group, a butoxy group, a propoxy group, a methoxyethoxy group, etc.), an aryloxy group (e.g., a phenoxy group, a tolyloxy group, a naphthoxy group, a methoxyphenoxy group, etc.), an alkoxycarbonyl group (e.g., a methoxycarbonyl group, a butoxycarbonyl group, a phenoxymethoxycarbanoyl group, etc.), an aryloxycarbonyl group (e.g., a phenoxycarbonyl group, a tolyloxycarbonyl group, a methoxyphenoxycarbonyl group, etc.), an acyl group (e.g., a formyl group, an acetyl group, a valeryl group, a stearoyl group, a benzoyl group, a toluoyl group, a naphthoyl group, a p-methoxybenzoyl group, etc.), an acyloxy group (e.g., an acetoxy group, a benzyloxy group, etc.), an acylamino group (e.g., an acetamido group, a benzamido group, a methoxyamido group, etc.), an anilino group (e.g., a phenylamino group, an N-methylanilino group, an N-phenylanilino group, an N-acetylanilino group, etc.), an alkylamino group (e.g., an n-butylamino group, an N,N-diethylamino group, a 4-methoxy-n-butylamino group, etc.), a carbamoyl group (e.g., an n-butylcarbamoyl group, an N,N-diethylcarbamoyl group, etc.), a sulfamoyl group (e.g., an n-butylsulfamoyl group, an N,N-diethylsulfamoyl group, an n-dodecylsulfamoyl group, an N-(4-methoxy-n-butyl)- sulfamoyl group, etc.), a sulfonylamino group (e.g., a methylsulfonylamino group, a phenylsulfonylamino group, a methoxymethylsulfonylamino group, etc.), a sulfonyl group (e.g., a mesyl group, a tosyl group, a methoxymethanesulfonyl group, etc.), etc.

The alkyl group shown by $R^6$, $R^7$, $R^8$, $R^9$, or $R^{10}$ in formulae [II] [V] described above may be a substituted or unsubstituted alkyl group, or may be a straight chain or a branched alkyl group. The number of carbon atoms of the alkyl group excluding the carbon atom(s) of the substituent is 1 to 20 and examples thereof include a methyl group, an ethyl group, a propyl group, a butyl group. a hexyl group, an octyl group, a decyl group, a dodecyl group, a tetradecyl group, a hexadecyl group, a heptadecyl group, an octadecyl group, etc.

Also, the aryl group shown by said $R^6$, $R^7$, $R^8$, $R^9$, or $R^{10}$ includes a substituted or unsubstituted aryl group. The number of carbon atoms in the acyl group excluding the carbon atom(s) of the substituent is preferably from 6 to 14, and examples thereof include a phenyl group, a tolyl group, a naphthyl group, etc.

The non-metallic atomic group shown by Y in formula [III] or [V] described above which is necessary for forming a 5-membered or a 6-membered ring includes a non-metallic atomic group represented by formula (a), (b) (c) (d) or (e) described below:

(a)

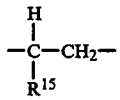

(b)

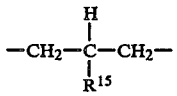

(c)

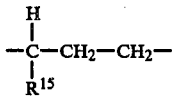

(d)

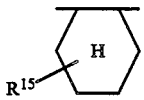

(e)

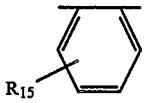

wherein, $R^{15}$ represents a hydrogen atom or an alkyl group. The alkyl group shown by said $R_{15}$ is a substituted or unsubstituted alkyl group. The number of carbon atoms of the alkyl group excluding the carbon atom (s) of the substituent is preferably from 1 to 20. Also, the alkyl group may be a straight chain or a branched alkyl group. Specific examples of the alkyl group include the substituents illustrated above for $R^2$, $R^3$, $R^4$, and $R^5$.

In the metal complexes represented in formula [II], [III], [IV], or [V] described above, preferred complexes are those represented by following formula [IIa], [IIb], [IIIa], [IVa], [IVb], or [Va], respectively.

[IIa]

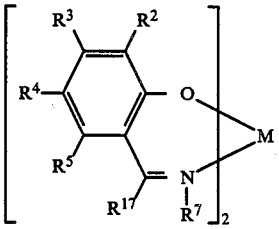

[IIb]

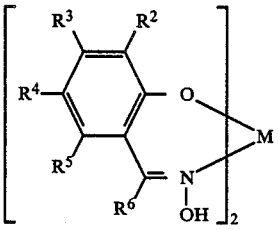

[IIIa]

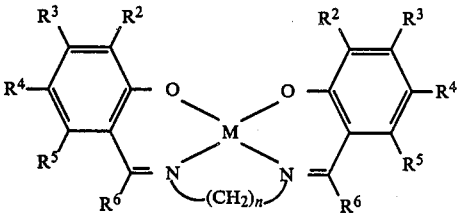

-continued

[IVa]

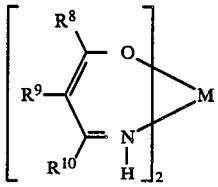

[IVb]

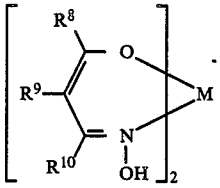

[Va]

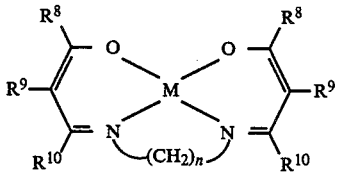

wherein $R^2$ to $R^{10}$ and M are defined as defined hereinabove in the definition for formulae [II] to [V], n represents 2 or 3 and $R^{17}$ represents an alkyl group or an aryl group.

In the complexes shown by formulae [IIa], [IIb], [IIIa], [IVa], [IVb], and [Va] described above, particularly preferred complexes are those shown by formulae [IIa], [IIb] and [IIIa]. Also, the more preferred complexes shown by formula [IIa], [IIb], or [IIIa] described above is when $R^2$ is a group capable of causing hydrogen bonding, at least one of $R^3$, $R^4$, or $R^5$ is a hydrogen atom, a hydroxy group, an alkyl group, or an alkoxy group, and the sum of carbon atoms of the group shown by $R^2$, $R^3$, $R^4$, $R^5$, $R^6$, or $R^7$ is at least 4.

The group shown by $R^2$ which is capable of forming a hydrogen bond includes a group containing —O— (e.g., a methoxy group, an ethoxy group, a propoxy group, a butoxy group, an n-octyloxy group, a 2-ethylhexyloxy group, a decyloxy group, an n-dodecyloxy group, a 2-hexyldecyloxy group, an isostearyloxy group, a benzyloxy group, a piperonyloxy group, a phenoxy group, a trimethylsilyloxy group, etc.), a group containing —S— (e.g., a methylthio group, an ethylthio group, a propylthio group, a butylthio group, a 2-ethylhexylthio group, an n-dodecylthio group, a 2-hexyldecylthio group, an isostearylthio group, a substituted or unsubstituted phenylthio group, etc.), a group containing carbonyl group (e.g., an acetyl group, a propionyl group, a butyryl group, a hexanoyl group, an octanoyl group, a stearoyl group, a benzoyl group, etc.), a group containing oxycarbonyl group (e.g., a methoxycarbonyl group, an ethoxycarbonyl group, a butoxycarbonyl group an n-decyloxycarbonyl group, a stearyloxycarbonyl group, a phenoxycarbonyl group, etc.), a carbamoyl group (e.g., a methylcarbamoyl group, an ethylcarbamoyl group, a butylcarbamoyl group, an N,N-diethylcarbamoyl group, an n-dodecylcarbamoyl group, a phenylcarbamoyl group, etc.), a sulfamoyl group (e.g., a methylsulfamoyl group, an N,N-diethylsulfamoyl group, a butylsulfamoyl group, an n-dodecylsulfamoyl group, a phenylsulfamoyl group, etc.), a group having a sulfonyl group (e.g., a mesyl group, an ethanesulfonyl group, a benzenesulfonyl group, a tosyl group, etc.), a group having a sulfonylamino group (e.g., a methylsulfonylamino group, a butylsulfonylamino group, etc.), an acylamino group (e.g., an acetylamino group, a benzoylamino group, etc.), a group having a carbonyloxy group (e.g., an acetyloxy group, a butyryloxy group, a benzyloxy group, etc.), an amino group (e.g., —$NH_2$ group, a methylamino group, a diethylamino group, a dibutylamino group, a hexylamino group, a benzylamino group, an anilino group, etc.), a hydroxy group, a nitro group, a cyano group, a carboxylic acid group, a sulfonic acid group, and a halogen atom.

The metal complexes shown by formulae [II], [III], [IV] or [V] described above which are particularly effective for the practice of this invention include the compounds shown by following structural formulae although the complexes of this invention are not limited to these compounds.

M-1

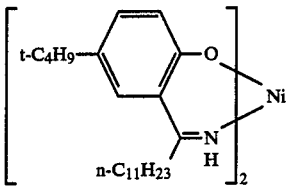

M-2

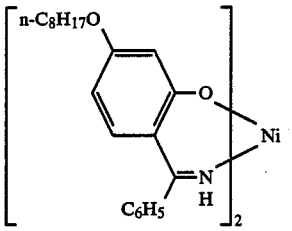

M-3

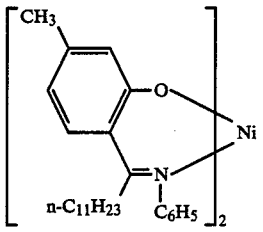

M-4

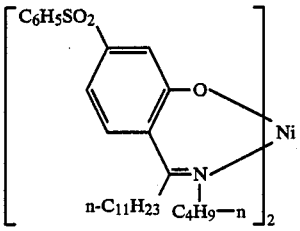

-continued

M-5

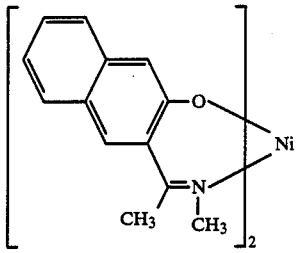

M-6

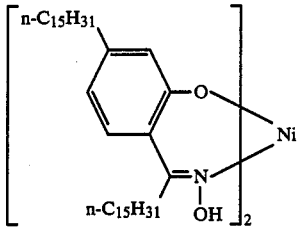

M-7

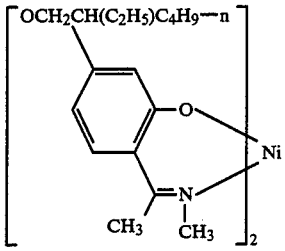

M-8

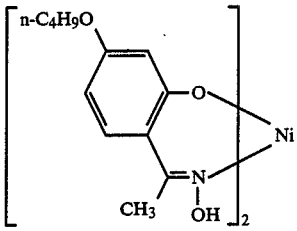

M-9

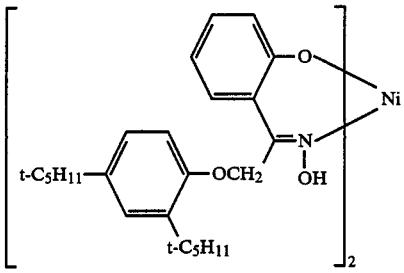

M-10

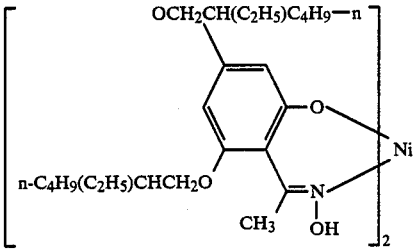

-continued
M-11
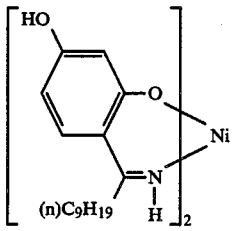
M-12
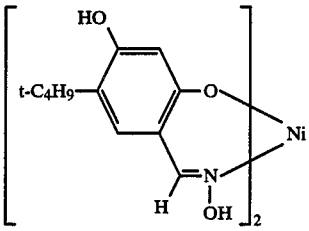
M-13
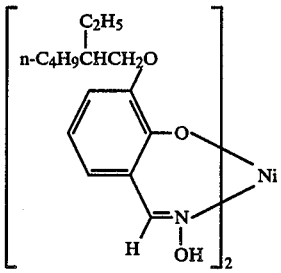
M-14
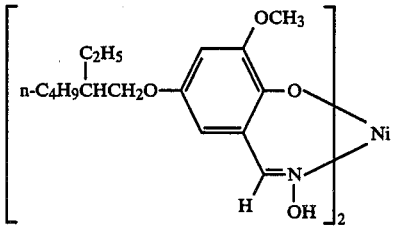
M-15
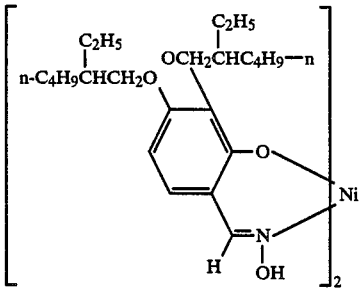
M-16
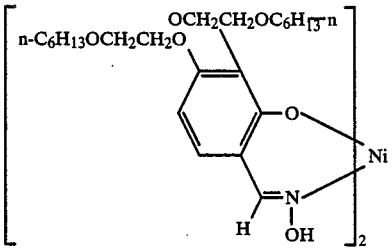
-continued
M-17
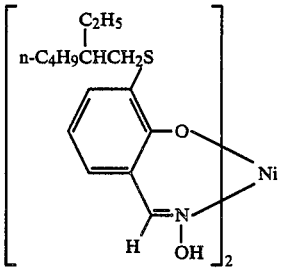
M-18
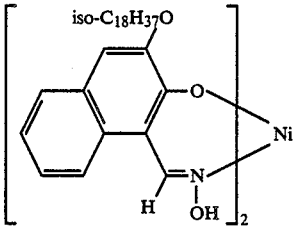
M-19
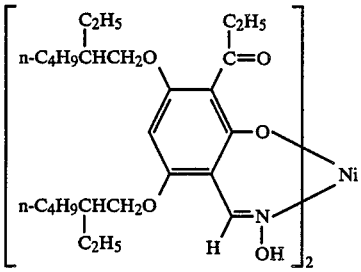
M-20
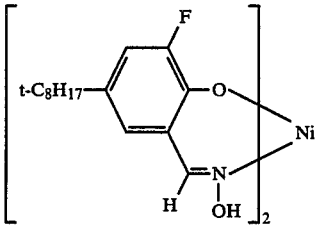
M-21
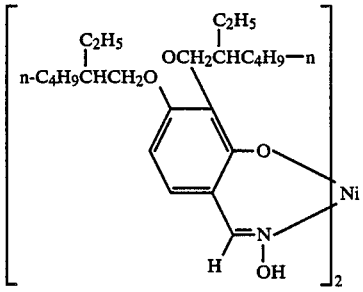
M-22
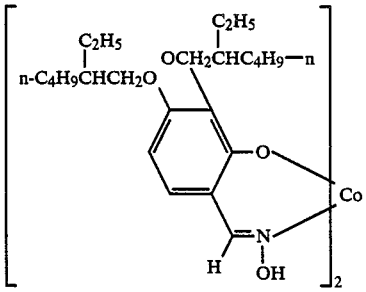

-continued
M-23
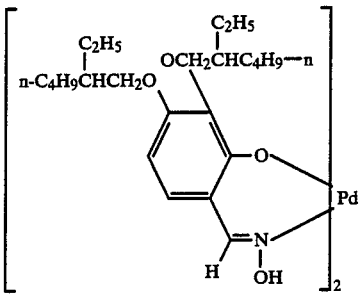
M-24
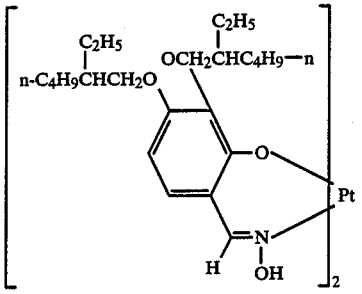
M-25
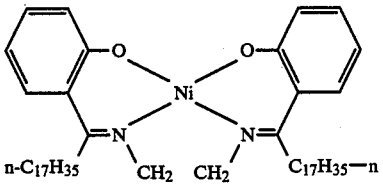
M-26
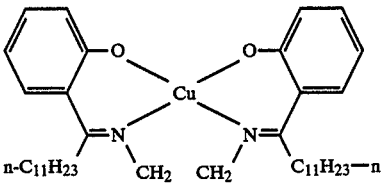
M-27
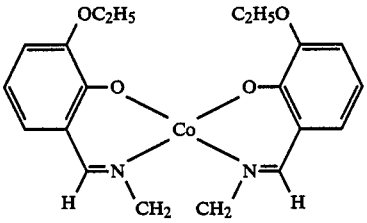
M-28
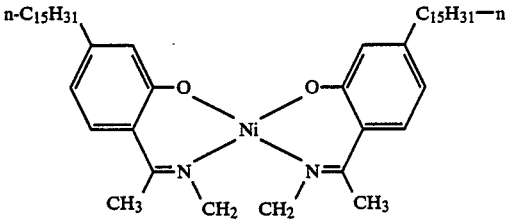
-continued
M-29
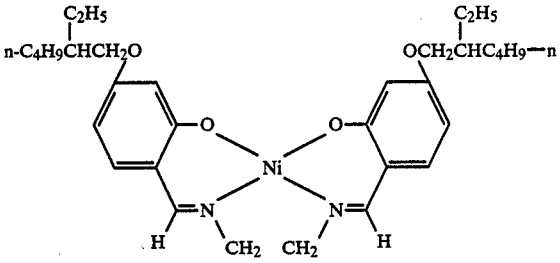
M-30
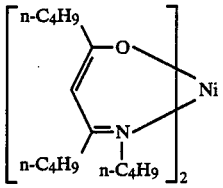
M-31
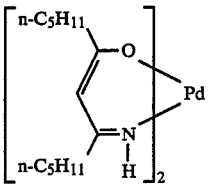
M-32
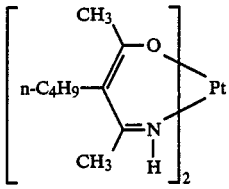
M-33
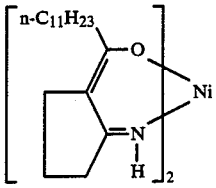
M-34
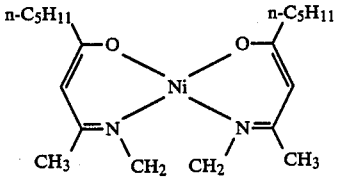
M-35
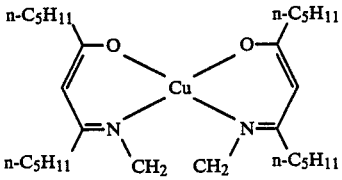
M-36
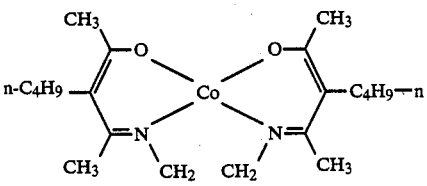

-continued

M-37

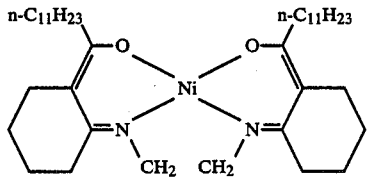

M-38

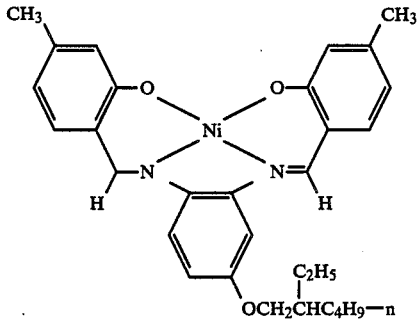

M-39

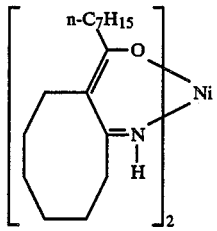

M-40

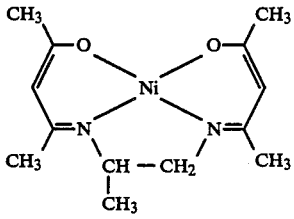

The metal complexes of formulae [II] to [V] for use in this invention can be synthesized by the methods described, for example. in U.S. Pat. Nos. 4,246,330, 4,241,154, 4,229,843, 4,246,329 and 4,248,949 and Japanese Patent Application (OPI) No. 12,129/80.

In formula [VI] described above, $R_{24}$ represents an aliphatic group having 1 to 30 carbon atoms, an aromatic group having 6 to 30 carbon atoms, a heterocyclic group having 2 to 30 carbon atoms, an aliphatic oxy group having 1 to 30 carbon atoms, an aromatic oxy group having 6 to 30 carbon atoms, an aliphatic thio group having 1 to 30 carbon atoms, an aromatic thio group having 6 to 30 carbon atoms, a carbonamido group having 2 to 30 carbon atoms, a sulfonamido group having 1 to 30 carbon atoms, a monosubstituted amino group having 1 to 30 carbon atoms, or a di-substituted amino group having 2 to 30 carbon atoms and m represents an integer of 1 to 4. When m is 2 to 4, said $R_{24}$ groups may be the same or different and also may be combined with each other to form a ring.

The two hydroxy groups in formula [VI] are in a para-position or an ortho-position relative to each other. The hydroquinone derivatives or cathecohl derivatives represented by formula [VI] may form a bis-, tris- or tetrakis compound or a polymer by bonding the substituents $R_{24}$ groups thereof and in this case, the number of carbon atoms of R24 may not be in the above-described range.

In formula [VII] described above, $R_{25}$ represents an aliphatic group having 1 to 30 carbon atoms, an aromatic group having 6 to 30 carbon atoms, a heterocyclic group haivng 2 to 30 carbon atoms, or a substituted silyl group having 3 to 30 carbon atoms; $R_{26}$ has the same significance as defined for $R_{24}$ in formula [VI]; n represents an integer of 1 to 3: j represents an integer of 0 to 5; and the sum of n and j is 6 or less. When n is plural, said $OR_{25}$ groups may be the same or different. Also, when said two $OR_{25}$ groups, said two $R_{26}$ groups, or said $OR_{25}$ and $R_{26}$ are in an ortho-position relative to each other, they may combine with each other to form a ring. Examples of such a ring are substituted or unsubstituted methylenedioxy group, a substituted or unsubstituted ethylenedioxy group, a substituted or unsubstituted trimethylene group, a substituted or unsubstituted tetramethylene group, a substituted or unsubstituted trimethyleneoxy group, etc. Examples of substituents for these substituted groups are the same as substituents A shown hereinabove.

The substituted oxybenzene derivatives shown by formula [VII] may combine with each other at $R_{25}$ or $R_{26}$ to form a bis-, tris- and tetrakis compound and a polymer and in this case the number of carbon atoms of said $R_{25}$ or $R_{26}$ may not be in the above-defined range.

In formula [VIII] described above. $R_{27}$, $R_{28}$, $R_{29}$, and $R_{30}$ each represents a hydrogen atom or an aliphatic group having 1 to 30 carbon atoms; Y represents a hydrogen atom, an aliphatic group having 1 to 30 carbon atoms, an acyl group having 1 to 30 carbon atoms, an aliphatic sulfonyl group having 1 to 30 carbon atoms, an aromatic sulfonyl group having 6 to 30 carbon atoms, an aliphatic oxycarbonyl group having 2 to 31 carbon atoms, an aromatic oxycarbonyl group having 6 to 31 carbon atoms, an oxyradical group or a hydroxy group; and Z represents a non-metallic atomic group necessary for forming a 5-membered to 7-membered ring together with

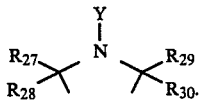

The heterocyclic ring formed by Z and

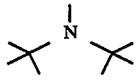

may further contain at least one of N, O and S atoms as heteroatoms, >C=0 group and $>SO_2$ group. Examples of the ring include piperidine, pyrrolidine, morpholine, 4-thiapiperidine, piperazine, 4-thiapiperidine-4-oxide, 4-thiapiperidine-4,4-dioxide, piperidine-4-one, etc. These heterocyclic rings may further have a substituent in addition to $R_{27}$, $R_{28}$, $R_{29}$, $R_{30}$, and Y. Examples of such a substituent include an aliphatic group having 1 to 30 carbon atoms, an aliphatic oxy group having 1 to 31 carbon atoms preferably 2 to 31 carbon atoms, an aliphatic and aromatic carbonamido group having 2 to 30 carbon atoms, an acyloxy group having 2 to 30 carbon atoms, an aliphatic oxycarbonyl group having 2 to 31 carbon atoms, etc.

The heterocyclic rings shown by formula [VIII] described above may combine with each other at said substituent $R_{27}$, $R_{28}$, $R_{29}$, $R_{30}$, Y or Z to form a bis-, tris- or tetrakis compound or a polymer. In this case, the number of carbon atoms of said $R_{27}$, $R_{28}$, $R_{29}$, $R_{30}$, Y or Z may not be in the above-defined range.

In formula [VI] described above, $R_{24}$ is preferably an aliphatic group, an aliphatic and aromatic carbonamido group, an aliphatic and aromatic sulfonamido group, an aliphatic oxy group, or an aliphatic thio group and is more preferably an aliphatic group. Also, m is preferably 1 to 3 and is more preferably 2. The two hydroxy groups are preferably in a para-position relative to each other.

The most preferred compound of the compounds shown by formula [VI], described above is represented by following formula [VI-a]

[VI-a]

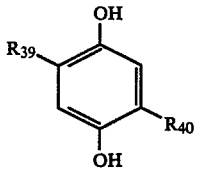

wherein $R_{39}$ and $R_{40}$, which may be the same or different, each represents an aliphatic group having 1 to 30 carbon atoms. Preferable examples of the aliphatic group include a methyl group, an ethyl group, an isopropyl group, a t-butyl group, a 1,1-dimethylpropyl group, a 1,1-dimethylbutyl group, a cyclopentyl group, a cyclohexyl group, a 2-hexyl group, a 1,1,3,3-tetramethylbutyl group, a 2-dodecyl group, an n-pentadecyl group, a 2-hexadecyl group, a 1-ethyl-1,5,9-trimethyldecyl group, a 4-hexyloxycarbonyl-1,1-dimethylbutyl group, etc.

In formula [VII] described above, $R_{25}$ is preferably an aliphatic group or a substituted silyl group and $R_{26}$ is preferably an aliphatic group. Also, n is preferably 2 or 3 and j is preferably 1 to 3. Preferable positions for $OR_{25}$ and $R_{26}$ on the benzene ring are ortho- and para-positions relative to each other.

The most preferred compound of the compounds shown by formula [VII] is represented by following formula [VII-a], [VII-b], [VII-c], [VII-d], or [VII-e];

[VII-a]

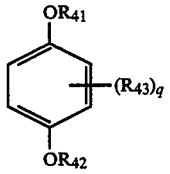

[VII-b]

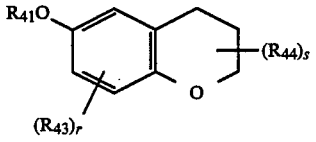

[VII-c]

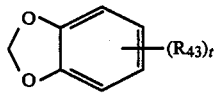

-continued

[VII-d]

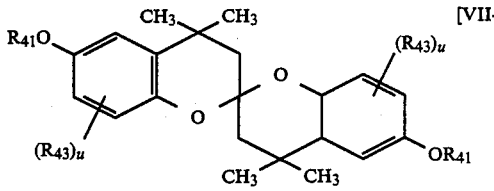

[VII-e]

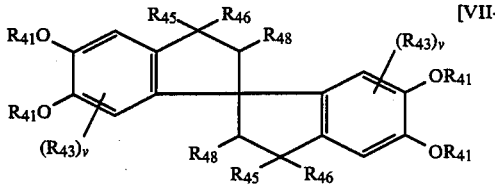

In formulae, [VII-a], [VII-b], [VII-c], [VII-d] and, [VII-e], $R_{41}$ and $R_{42}$, which may be the same or different, each represents an aliphatic group having 1 to 30 carbon atoms (specific examples thereof are same as those described above in regard to R39 of formula [VI-a]) or a substituted silyl group having 3 to 30 carbon atoms (e.g., a trimethylsily group, a dimethylpropylsily group, et.); $R_{43}$ represents an aliphatic group having 1 to 30 carbon atoms (specific examples thereof are the same as those described above in regard to $R_{39}$), an aliphatic oxy group having 1 to 30 carbon atoms (e.g., a methoxy group. an ethoxy group. an n-propyloxy group, an n-butoxy group,a 2-methoxyethoxy group, an n-dodecyloxy group, etc.), an aliphatic thio group having 1 to 30 carbon atoms (e.g., a methylthio group, an n-butylthio group, an n-dodecylthio group. etc.), or a carbon amido group having 2 to 30 carbon atoms (e.g., an acetamido group, a tetradecanamido group, a benzamido group, etc.); $R_{44}$ represents an aliphatic group having 1 to 30 carbon atoms (specific examples thereof are same as those described above in regard to $R_{39}$) or an aromatic group having 6 to 30 carbon atoms (e.g., a phenyl group, a tolyl group, a 4-hydroxyphenyl group, a 2,5-dimethoxy-3-methylphenyl group, etc.); $R_{45}$, $R_{46}$, $R_{47}$, and $R_{48}$, which may be the same or different, each represents a hydrogen atom or an aliphatic group having 1 to 12 carbon atoms (e.g., a methyl group, an ethyl group. an n-propyl group, etc.); q represents an integer of 1 to 4; r represents an integer of 0 to 3; s represents an integer of 0 to 6: t represents an integer of 1 to 4; u represents an integer of 0 to 3; and v represents an integer of 0 to 2. When said q, r, s, t, or u are plural, said plural $R_{43}$ groups or $R_{44}$ groups may be the same or different.

In formulla [VIII] described above, $R_{27}$, $R_{28}$, $R_{29}$, and $R_{30}$ are preferably a hydrogen atom or an aliphatic group having 1 to 12 carbon atoms (e.g., a methyl group, an ethyl group, etc.) and are more preferably a methyl group. Y in the formula is preferably a hydrogen atom, an aliphatic group having 1 to 12 carbon atoms (e.g., a methyl group, an ethyl group, an n-butyl group, etc.), an acyl group having 1 to 12 carbon atoms (e.g., an acetyl group. a butanoyl group, an acryloyl group, a benzoyl group, etc.), or an oxyradical group. The heterocyclic ring formed by Z and

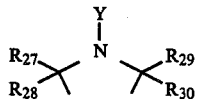

is preferably a piperidine.

The most preferred example of the compounds shown by formula [VIII-a]. described above is shown by following fo formula [VIII-a].

[VIII-a]

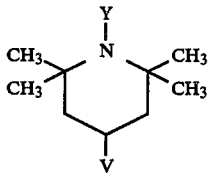

wherein, Y has the same significance as defined above and V represents an acyloxy group having 2 to 30 carbon atoms (e.g., an acetoxy group, a benzoyloxy group, an n-dodecanoyloxy group, etc.), or an aliphatic and aromatic carbonamido group having 2 to 30 carbon atoms (e.g., a 2-ethylhexaneamido group, an n-tetradecaneamido group, etc.).

A compound which is formed by combining two or more residues of at least two different compounds represented by formulae [VI], [VII] and [VIII] may also be used.

The piperidine derivatives shown by formula [VIII-a] above may combine with each other at said Y or V to form a bis-, tris-, tetrakis compound or a polymer and in this case, the number of carbon atoms defined above may not be the above-defined range.

Specific examples of the compound represented by formulae [VI], [VII] and [VIII] and derivatives thereof described above are illustrated below but the compounds for use in this invention are not limited to these compounds. pounds.

(1)

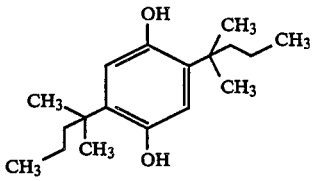

(2)

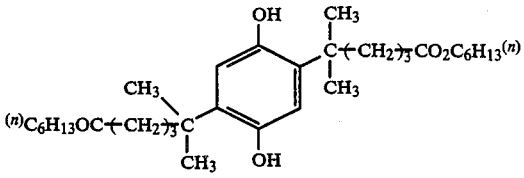

(3)

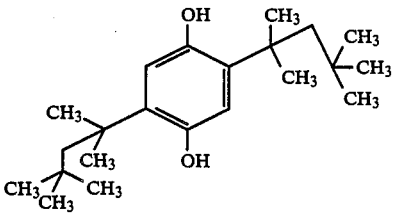

-continued (4)

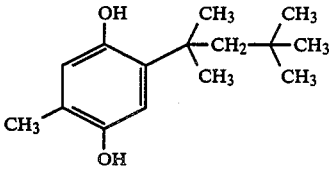

(5)

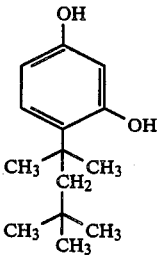

(6)

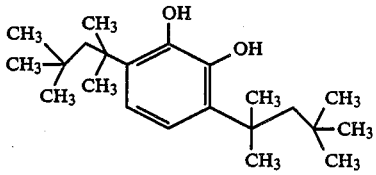

(7)

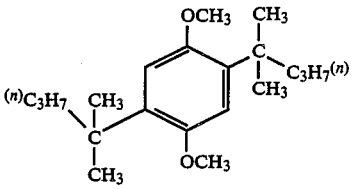

(8)

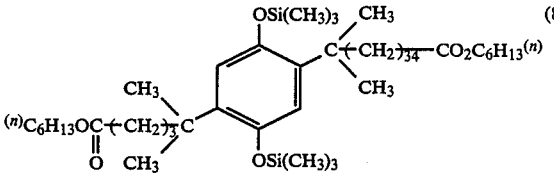

(9)

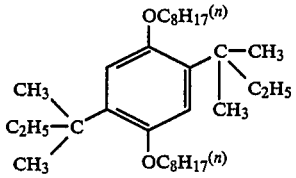

(10)

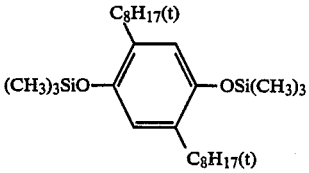

(11)

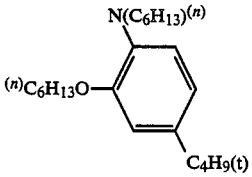

-continued
(12)
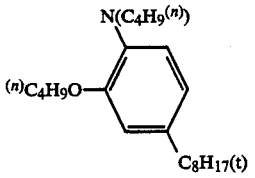
(13)
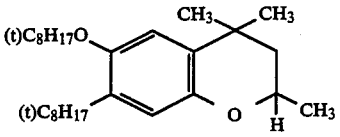
(14)
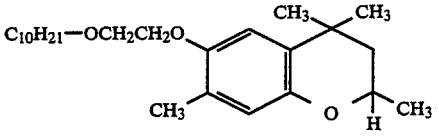
(15)
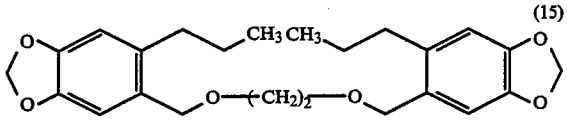
(16)
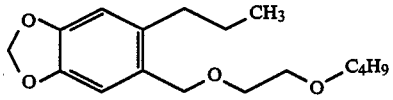
(17)
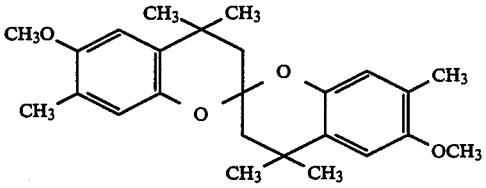
(18)
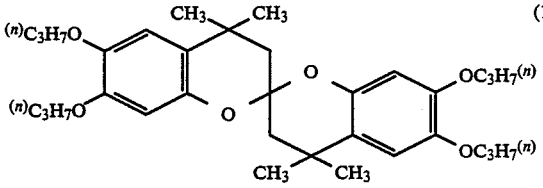
(19)
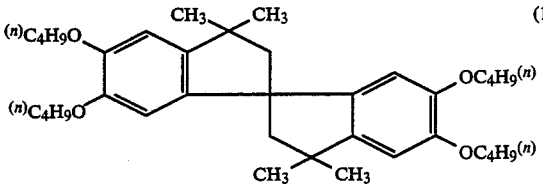
(20)
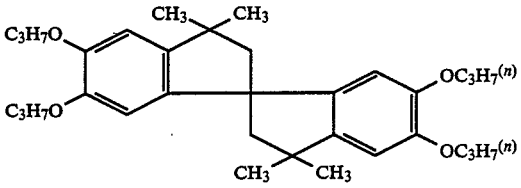
(21)
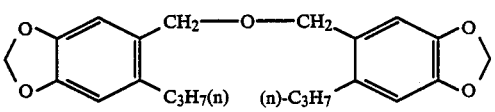
-continued
(22)
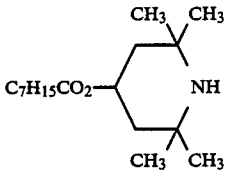
(23)
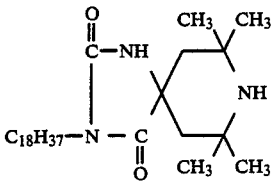
(24)
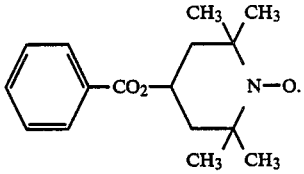
(25)
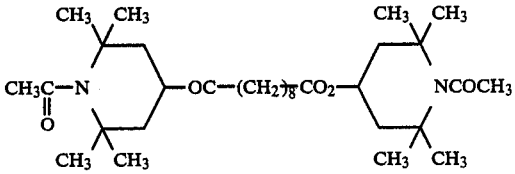
(26)
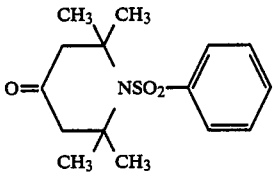
(27)
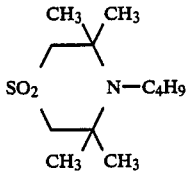
(28)
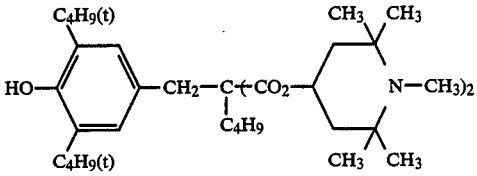
(29)
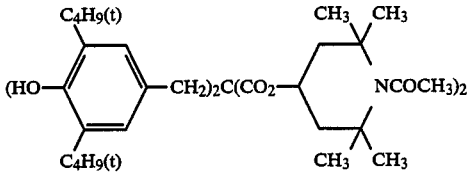
(30)
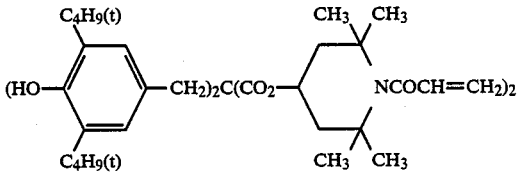

-continued (31)

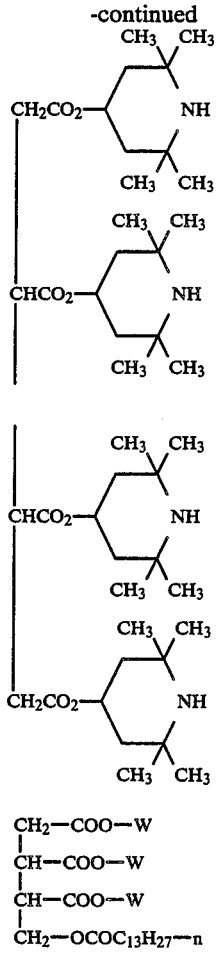

(32)

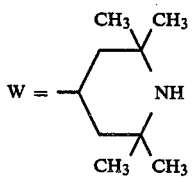

(33)

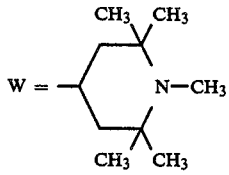

(34)

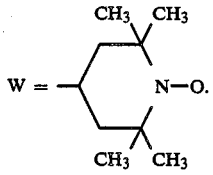

The compounds shown by formulae [VI], [VII], and [VIII] described above can be synthesized by the methods described in British Pat. Nos. 1,326,889, 1,347,556, 1,354,313, 1,410,846, 2,062,888, 2,066,975, and 2,077,455, U.S. Pat. Nos. 3,336,135, 3,432,300, 3,573,050, 3,574,627, 3,700,455, 3,764,337, 3,935,016, 3,982,944, 4,254,216, 4,268,593, and 4,279,990, Japanese Patent Application (OPI) Nos. 97353/85, 1024/76, 146,234/77, 147,434/77, 152,225/77, 9528/78, 17,729/78, 20, 327/78, 55,121/78, 145,530/79, 6321/80, 69,141/80, 89,835/80, 89,826/80, 125,141/80, 21,004/80, 52,747/81, 129,644/81, 25,141/83, 114,026/83, 5,246/84, and 10,539/84, Japanese Patent Publication Nos. 20,977/67, 21,625/73, 1,420/76, 6,623/77, 27,534/77 and 12,337/79.

The amounts added of the compounds of formulae [II] to [VIII] and derivatives thereof for use in this invention is preferably from 0.01 mol to 1 mol, more preferably from 0.05 mol to 0.8 mol per mol of the cyan coupler defined in this invention. When the amount exceeds 1 mol it is not preferable because stain tends to form or density tends to decrease.

The compounds of formulae [II] to [VIII] and derivatives thereof for use in this ivnention exist in the same layer containing the cyan coupler of formula [I] described above or in an adjacent layer thereto. However, it is preferred that said compounds and said cyan couplers are present in the some layers. More preferably, the compounds of formulae [II] to [VIII] and derivatives thereof are coemulsified with the cyan coupler of formula [I] and the emulsion is coated as a layer.

In this invention. various color couplers can be used together with the cyan couplers and the compounds described above in the color photographic light-sensitive materials. Specific examples of these cyan dye forming couplers, magenta dye forming couplers, and yellow dye forming couplers are described in *Research Disclosure.* 1978 Dec. (17643), Paragraph VII-D and also in the patents cited in *Research Disclosure,* 1979, Nov. (18717). It is preferred that each of these couplers is rendered non-diffusile by the introduction of a ballast group or by forming a bis-, tris or tetrakis compound or a polymer thereof. The couplers may be of two equivalent or four equivalent. Furthermore, couplers wherein the formed dyes of which properly diffuse to improve the graininess of the color photographic materials, DIR couplers capable of releasing a development inhibitor with a coupling reaction for giving an edge effect or double layer effect, or colored couplers for giving a color correction can be used in this invention.

The yellow couplers which are preferred for use in this invention include the α-pivaloyl or the α-benzoyl acetanilide couplers which release the dye at an oxygen atom or at a nitrogen atom. Particularly preferred examples of these two-equivalent yellow couplers include the yellow couplers of the type which release dyes at the oxygen atom as described in U.S. Pat. Nos. 3,408,191, 3,417,928, 3,933,501, 4,022,620, etc., and the yellow couplers of the type which release dyes at the nitrogen atom as described in U.S. Pat. Nos. 3,973,968, 4.311,023, Japanese Patent Publication No. 10,739/83, Japanese Patent Application (OPI) No. 132,926/75. West German Patent Application (OLS) Nos. 2,219,917, 2,261,361. 2,329,587, 2,433,812, etc.

The magenta couplers which can be used in this invention include, for example, 5-pyrazolone coupler and, pyrazolo[5.1-C.][1,2.4] triazoles which are described in U.S. Pat. No. 3,725,067, etc., and pyrazolo [5,1-b][1,2,4]-triazoles which are described in European Patent 119.860, etc. Magenta couplers which are formed into two equivalent matenta couplers by a releasable group bond to the coupling active position with a nitrogen atom or a sulfur atom are preferably used in this invention. Additional couplers which have resistance or fastness to humidity and temperature can be used together with the cyan couplers of formula [I] or derivatives thereof described above. Specific examples of these additional couplers are phenolic couplers described in U.S. Pat. No. 3,772,002, etc., 2,5-diacylaminophenolic couplers described in Japanese Patent Application (OPI) Nos. 31,953/84, 166,956/84, 166,956/84, etc., and phenolic couplers having a phenylureido group at the 2-position thereof and an acylamino group at the 5-position thereof described in U.S. Pat. No. 4,333,999, etc.

Each of the dye-forming couplers which are used together with the cyan couplers of formula [I] and derivatives thereof described above in this invention are dissolved in high-boiling organic solvent such as a phthalic acid ester having 16 to 32 carbon atoms or a phosphoric acid ester. If desired, a low-boiling organic solvent such as ethyl acetate, etc. is also used to dissolve the couplers. The dissolved couplers are then dispersed by emulsification in an aqueous medium. The standard amount for each of the main or major couplers which are used includes preferably from 0.01 to 0.5 mol of yellow coupler. from 0.003 to 0.3 mol of magenta coupler. and from 0.002 to 0.3 mol of cyan coupler per mol of the light-sensitive silver halide in the silver halide emulsion layer in which the coupler is incorporated.

The photographic emulsion layers of the color photographic materials of this invention use silver bromide, silver iodobromide, silver iodochlorobromide, silver chlorobromide, or silver chloride. Silver iodobromide or silver iodochlorobromide containing at most 30 mol % silver iodide is preferred. Silver iodobromide containing from 2 mol % to 25 mol % silver iodide is particularly preferrred.

There is no particular restriction regarding the form of silver halide grains in the photographic emulsions in this invention. That is, the silver halide grains may include the so-called regular grains such as cube shaped. octahedron shaped, tetradecahedron shaped. etc., or the grains may be irregular shaped (e.g., sphere shaped, etc.) Furthermore, the silver halide grains may have a crystal defect such as twinning, etc., or may be a composite form thereof.

Also, as to the grain size, the silver halide grains may be fine grains having a grain size of less than about 0.1 micron or they may be large grains having a projected area diameter of up to about 10 microns. The silver halide emulsion for use in this invention may be a monodispersed emulsion having a narrow silver halide grain size distribution. Alternatively, the silver halide emulsion for use in this invention may be a poly-dispersed emulsion having a broad silver halide grain distribution.

The silver halide emulsions for use in this invention can be prepared by the methods described, for example, in P. Grafkides, *Chimie et Physique Photographique,* Paul Montel, 1967, G. F. Duffin. *Photographic Bmulsion Chemistry.* Focal Press, 1966, V.L. Zelikman et al, *Making and Coating Photographic Emulsion,* Focal Press. 1964, etc. Thus. an acid method, a neutralization method, an ammonia method, etc., may be used for preparing the photographic emulsions. Also, the methods for reacting a soluble silver salt and a soluble halide which may be used include a single jet method, a double jet method, or a combination thereof. Furthermore, a back mixing method for forming silver halide grains in the presence of excessive silver ion may be used. One type of system of the double jet method which may be used includes a so-called controlled double jet method which maintains a constant pAg in a liquid phase for forming silver halide grains. In this method the silver halide in the silver halide emulsion has a regular crystal form and the grain size thereof is almost uniform.

Two or more types of silver halide emulsions separately prepared may be used as a mixture thereof.

Also, tabular silver halide grains having an asp act ratio of at least 5 can be used in this invention. Tabular silver halide grains can be easily prepared by the methods described in Cleve Gutoff, *Photographic Theory and Practice,* (1930), p 131, *Photographic Science and Engineering,* Vol.14, 248–257 (1970), U.S. Pat. Nos. 4,434,226, 4,414,310, 4,433,048. British Patent No. 2,112.157. etc. Advantages obtained when using tabular silver halide grains include an increased covering power and also an increased efficiency in color sensitizing by the sensitizing dyes as described in U.S. Pat. No. 4,434,226 previously cited above.

The crystal structure of the silver halide for use in this invention may have a uniform halide composition throughout the whole grain. Alternatively the crystal structure may have a different halogen composition between the inside portion and the outside portion thereof, it may have a layer structure. These silver halide grains are disclosed in British Patent No. 1,027,146, U.S. Pat. Nos. 3,505,068, 4,444,877, Japanese Patent Application (OPI) No. 143,331/85, etc. Also, silver halides each having a different composition may be combined with each other by an epitaxial junction. Furthermore, a silver halide may be combined with a compound other than silver halide, such as silver rhodanate, lead oxide, etc. These silver halide grains are disclosed in U.S. Pat. Nos. 4,094,684, 4,142,900, 4,459,353, British Patent No. 2,038,792, U.S. Pat. Nos. 4,349,622, 4,395,478, 4,433,501, 4,463,087, 3,656,962, 3,852,067, Japanese Patent Application (OPI) No. 162,540/84, etc.

The silver halide photographic emulsions for use in this invention may be spectrally sensitized by sensitizing dyes which are known in the field of photography. Also, for the purpose of preventing the occurrence of fog during production, storage and photographic processing of the color photographic materials, antifoggants or stabilizers may be used. Specific examples and methods of using antifoggants and stabilizers are described, for example, in U.S. Pat. Nos. 3,954,474, 3,982,947, Japanese Patent Publication No. 28,660/77, *Research Disclosure,* 17643 (1978, Dec.). VIA and VIM, B. J. Birr, *Stabilization of Photographic Silver Halide Emulsions,* Focal Press, 1974, etc.

The color photographic light-sensitive materials of this invention may further contain hydroquinones, aminophenols, sulfonamidophenols, etc., as color fogging preventing agents or color mixing preventing agents.

The color photographic materials of this invention may further contain ultraviolet absorbents such as benzotriazoles, etc., and specific benzotriazoles are described in *Research Disclosure,* 24239 (1984, June).

The color photographic materials of this invention may further contain water-soluble dyes in the hydrophilic colloid layers as filter dyes or for irradiation prevention, antihalation, etc.

The binder for the hydrophilic colloid layers and backing layers of the color photographic materials of this invention which may be used include gelatin, modified gelatin, synthetic hydrophilic polyemrs. etc. Furthermore, the hydrophilic colloid layers of the color photographic materials of this invention may contain a hardening agent such as vinylsulfone derivatives. A vinyl polymer having a sulfinate at the side chain may be used as a hardening accelerator.

The color photographic materials of this invention may further contain one or more types of surface active agents which are useful as coating aids and for static prevention, improving slidability, improving dispersibility, sticking prevention, and improving photographic characteristics such as development acceleration, increasing contrast, sensitization, etc.

The color photographic materials of this invention may further contain various types of stabilizers, stain preventing agents, developing agents or the precursors therefor, development accelerators or the precursors therefor, lubricants, mordants, matting agents, antistatic agents, plasticizers, and other additives useful for photographic light-sensitive materials in addition to the above-described additives. Specific examples of these additives are described in *Research Disclosure,* 17643 (1978. Dec.) and ibid, 18716 (1979, Nov.).

This invention may preferably be applied to a high speed color photographic film for photography having at least two silver halide emulsion layers of the same color sensitivity but each having a different sensitivity on a support. The typical order of the emulsion layers are a red sensitive emulsion layer, a green-sensitive emulsion layer, and a blue-sensitive emulsion layer from support side. However a reverse layer order such that a high-speed emulsion layer is disposed between enulsion layers having different color sensitivity may also be employed.

The color photographic material of this invention is, after imagewise exposure, processed by a color developer containing an aromatic primary amine color developing agent as the main component and thereafter processed by a bleach liquid and a fix liquid, a blix (bleach-fix) liquid, or a combination of them for removing developed silver.

The color developing solution to be used in the development of the present light-sensitive material is preferably an alkali aqueous solution mainly comprising an aromatic primary amine color-developing agent. As such a color-developing agent, a p-phenylene diamine compound is preferably used. Typical examples of such a compound include 3-methyl-4-amino-N,N-diethylaniline, 3-methyl-4-amino-N-ethyl-N-β-hydroxylethylaniline, 3-methyl-4-amino-N-ethyl-N-β-methanesulfonamide ethylaniline, 3-methyl-4-amino-N-ethyl-N-β-methoxyethylaniline, and sulfates, hydrochlorides, and p-toluenesulfonates thereof.

As bleaching agent there may be used a compound of a polyvalent metal such as iron (III), cobalt (III), chromium (VI), and copper (II), a peroxide a quinone, and nitroso compound. Typical exmaples of such a bleaching agent include ferricyanides, dichromates, organic complex salts of iron (III) or cobalt (III), aminopolycarboxylic acids such as ethylenediamine tetraacetic acid, diethylene triamine pentaacetic acid, nitrilo triacetic acid, 1,3-diamino-2-propanol tetraacetic acid; complex salts of organic acids such as citric acid, tartaric acid, and malic acid; persulfates; manganates; and nitrosophenol. Among these bleaching agents, iron (III) ethylene diamine tetraacetate and persulfates are preferably used in view of rapidness of processing and pollution consideration. Furthermore, ethylene diamine tetraacetic acid-iron (III) complex salt is useful in single bleaching bath, particularly in combined blix bath.

If desired, bleach accelerators such as iodine ion, thiourea, or thiol series compounds, etc., may be used together with a bleaching agent or a blixing agent.

After blixing or fixing, wash (or water washing) is frequently applied. It is preferred to employ a countercurrentwash system using two or mroe wash baths to save water. A multistage countercurrent stabilization process as described in Japanese Patent Application (OPI) No. 8,543/82 may be employed. For the stabilization process, a ph controlling buffer or formulin may be used and further an ammonium salt is a preferred additive for the process.

The invention is further explained below in detail by the following examples but the invention is not limited thereby.

EXAMPLE 1

Samples 101 to 107 of color photogrpahic materials were prepared by forming the following two layers on a cellulose triacetate film.

| | |
|---|---|
| **Layer 1: Red-Sensitive Emulsion Layer** | |
| Silver Iodobromide Emulsion (Silver iodide 5 mol %, mean grain size 0.6 μm) | 1.9 g/m$^2$ as silver |
| Sensitizing Dye I: | $4.2 \times 10^{-4}$ mol per mol of Ag |
| Sensitizing Dye II: | $1.4 \times 10^{-4}$ mol per mol of Ag |
| Gelatin | 1.8 g/m$^2$ |
| Coupler | Shown in Table 1 below |
| Metal Complex | Shown in Table 1 |
| Coupler Dispersing Oil (Oil-1) | 0.4 g/m$^2$ |
| **Layer 2: Protective Layer** | |
| Gelatin layer containing polymethyl methacrylate particles (diameter of about 1.5 μm) | |
| Gelatin | 1.1 g/m$^2$ |

Each layer further Contained gelatin hardening agent H and a surface active agent in addition to the above-described components.

TABLE 1

| Sample | Coupler (Amount)*1 | Metal Complex (Amount)*2 |
|---|---|---|
| 101 | EX - 1 (0.05) | — |
| 102 | I - 3 (0.05) | — |
| 103 | I - 3 (0.05) | M - 13 (0.2) |
| 104 | I - 3 (0.05) | M - 27 (0.2) |
| 105 | I - 13 (0.05) | — |
| 106 | I - 13 (0.05) | M - 7 (0.2) |
| 107 | I - 13 (0.05) | M - 26 (0.2) |

*1: Mol amount per mol of silver
*2: Mol amount per mol of coupler

The compounds used for preparing the above samples were as follows.

Sensitizing Dye I: Anhydro-5,5,'-dichloro-3,3,'-di-(γ-sulfopropyl)-9-ethyl-thiacarbocyanine hydroxide piridiniium salt.

Sensitizing Dye II: Anhydro-9-ethyl-3,3,'-di-(γ-sulfopropyl)-4,5,4',5'-dibenzothiacarbocyanine hydroxide triethylamine salt.

Coupler EX-1:

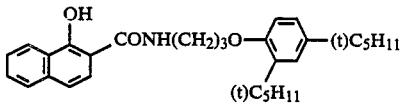

Oil-1:

-continued

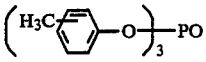

H-1:
$(CH_2{=}CHSO_2CH_2CONHCH_2)_2$

After applying a sensitometric light exposure to each of Samples 101 to 107 thus prepared, the sample was subjected to the following processing steps (A) at 38° C.

Processing Step (A)

| | |
|---|---|
| 1. Color Development | 3 min. 15 sec. |
| 2. Bleach | 6 min. 30 sec. |
| 3. Wash with water | 3 min. 15 sec. |
| 4. Fix | 4 min. 20 sec. |
| 5. Wash with water | 3 min. 15 sec. |
| 6. Stabilization | 1 min. 5 sec. |

The compositions of the processing liquids used in the above-described steps were as follows.

| | |
|---|---|
| Color Development | |
| Sodium Nitrilotriacetate | 1.0 g |
| Sodium Sulfite | 4.0 g |
| Sodium Carbonate | 30.0 g |
| Potassium Bromide | 1.4 g |
| Hydroxylamine Sulfate | 2.4 g |
| 4-(N—Ethyl-N—β-hydroxyethyl-amino)-2-methylaniline Sulfate | 4.5 g |
| Water to make | 1 liter |
| Bleach Liquid | |
| Ammonium Bromide | 160.0 g |
| Aqueous Ammonia (28%) | 14.0 ml |
| Ethylenediamine tetraacetic Acid Sodium Iron Salt | 130.0 g |
| Glacial Acetic Acid | 14.0 ml |
| Water to make | 1 liter |
| Fix Liquid | |
| Sodium Tetrapolyphosphate | 2.0 g |
| Sodium Sulfite | 4.0 g |
| Ammonium Thiosulfate (70%) | 175.0 ml |
| Sodium Biphosphite | 4.6 g |
| Water to make | 1 liter |
| Stabilization Liquid | |
| Formalin | 8.0 ml |
| Water to make | 1 liter |

Then, another set of samples were subjected to Processing Step (B) in the same manner as above except that the composition of the bleach liquid in Processing Step (A) is changed as follows. The bleach liquid imitates a fatigued state of bleach liquid after the processing of a large quantity of color photographic materials.

Processing Step (B)

| Bleach Liquid: | |
|---|---|
| (B - 1): | |
| Ammonium Bromide | 160.0 g |
| Aqueous Ammonia (28%) | 7.1 ml |
| Ethylenediamine-tetraacetic Acid Sodium Iron Salt | 117 g |
| Glacial Acetic Acid | 14 ml |
| Water to make | 1 liter |
| (B - 2): | |
| Ethylenediamine-tetraacetic Acid Sodium Iron Salt | 130 g |
| Water to make | 1 liter |

After addiing steel wool to bleach liquid (B - 2) closing the container holding the bleach liquid (B - 2) and allowing the bleach liquid (B - 2) to stand in the system to convert Fe(111)-BDTA into Fe(II)-BDTA,100 ml of bleach liquid (B - 1) was added to bleach liquid (B - 2) to provide the bleach liquid for Processing Step (B). The density is then measured on each sample thus processed. The relative cyan color density, that is, the value obtained by dividing the cyan color density in Processing Step (B) at the exposure level which produces the cyan coloring density of 1.5 in Processing Step (A) by 1.5 is shown in Table 2 below for each sample.

TABLE 2

| Sample | Relative Cyan Coloring Density |
|---|---|
| 101 (Comparative) | 0.64 |
| 102 (Comparative) | 1.00 |
| 103 (Invention) | 0.99 |
| 104 (Invention) | 1.00 |
| 105 (Comparative) | 0.99 |
| 106 (Invention) | 0.99 |
| 107 (Invention) | 0.99 |

From the results shown in Table 2 above, it can be seen that Samples (102 to 107) which use the cyan coupler defined in this invention show almost no reduction in color density even when processed in the fatigued bleach liquid. However, Sample (101) using a comparison cyan coupler shows a reduction in color density.

Samples 101 to 107 which were processed in Processing Step (A) were then subjected to a color image stability test wherein the emulsion layer side of each sample was exposed for 7 days using a fluorescent lamp fade meter (10,000 lux). The results obtained are shown in Table 3 below.

TABLE 3

| | Fluorescent Lamp (10,000 lux) Exposure for 7 Days | |
|---|---|---|
| Sample | $D_B$* | Color Image Residue(%)** |
| 101 (Comparative) | 0.04 | 89 |
| 102 (Comparative) | 0.11 | 98 |
| 103 (Invention) | 0.03 | 97 |
| 104 (Invention) | 0.04 | 98 |
| 105 (Comparative) | 0.10 | 98 |
| 106 (Invention) | 0.04 | 99 |
| 107 (Invention) | 0.03 | 98 |

*The value obtained by subtracting the yellow density at the unexposed portion before the light exposure from the yellow density at the unexposed portion after exposing the sample to the fluorescent lamp (10,000 lux) for 7 days.
**Color image residue at a portion having an initial density of 1.5.

From the results shown in Table 3, it can be seen that Comparison Samples 102 and 105 show a large amount of yellow stain as a result of the light exposure. In contrast, Samples 103, 104, 106, and 107 of this invention which contain the metal complex of this invention show a very small amount of yellow stain.

From the results described above, it becomes clear that the samples based on this invention are excellent and they do not indicate a reduction of cyan color density even when processed in a fatigued bleach liquid. In addition the samples of the present invention indicate less formation of yellow stain even after light exposure for a long period of time.

EXAMPLE 2

Multilayer color photographic materials 201 to 207 were prepared by fomring 14 layers having the composition shown below on a cellulose triacetate support.

| | |
|---|---|
| **Layer 1: Antihalation Layer** | |
| Gelatin layer containing black colloid silver | |
| Gelatin | 1.1 g/m$^2$ |
| **Layer 2: Interlayer** | |
| Gelatin layer containing an emulsified dispersion of 2,5-di-t-pentadecylhydroquinone and Coupler EX - 2, and silver iodobromide (silver iodide 1 mol %, mean grain size 0.07 μm). | |
| Gelatin | 1.2 g/m$^2$ |
| Coupler Dispersing Oil Oil-1 | 0.2 g/m$^2$ |
| Coupler Dispersing Oil Oil-2 | 0.02 g/m$^2$ |
| **Layer 3: 1st Red-Sensitive Emulsion Layer** | |
| Silver Iodobromide Emulsion (Silver iodide: 5 mol %, mean grain side: 0.7 μm) | 1.6 g/m$^2$ as Ag |
| Sensitizing Dye I | 4.2 × 10$^{-4}$ mol per mol of silver halide |
| Sensitizing Dye II | 1.4 × 10$^{-4}$ mol per mol of silver halide |
| Coupler | Shown in Table 4 |
| Metal Complex | Shown in Table 4 |
| Gelatin | 1.2 g/m$^2$ |
| Coupler Dispersing Oil,Oil-1 | 0.3 g/m$^2$ |
| **Layer 4: 2nd Red-Sensitive Emulsion Layer** | |
| Silver Iodobromide Emulsion (silver iodide: 10 mol %, mean grain size: 1.5 μm) | 1.9 g/m$^2$ as Ag |
| Sensitizing Dye I | 3.0 × 10$^{-4}$ mol per mol of silver halide |
| Sensitizing Dye II | 1.0 × 10$^{-4}$ mol per mol of silver halide |
| Coupler | Shown in Table 5 |
| Metal Complex | Shown in Table 5 |
| Gelatin | 1.3 g/m$^2$ |
| Coupler Dispersing Oil,Oil-1 | 0.3 g/m$^2$ |
| **Layer 5: Interlayer** | |
| Gelatin Layer | |
| Gelatin | 0.9 g/m$^2$ |
| **Layer 6: 1st Green-Sensitive Emulsion Layer** | |
| Silver Iodobromide Emulsion (silver iodide: 5 mol %, mean grain size: 0.8 μm) | 0.6 g/m$^2$ as Ag |
| Sensitizing Dye III: | 4.5 × 10$^{-4}$ mol per mol of silver halide |
| Sensitizing Dye IV: | 1.8 × 10$^{-4}$ mol per mol of silver halide |
| Coupler EX - 6 | 0.071 mol per mol of silver halide |
| Coupler EX - 7 | 0.015 mol per mol of silver halide |
| Coupler EX - 8 | 0.006 mol per mol of silver halide |
| Gelatin | 0.5 g/m$^2$ |
| Coupler Dispersing Oil,Oil-1 | 0.15 g/m$^2$ |
| **Layer 7: 2nd Green-Sensitive Emulsion Layer** | |
| Silver Iodobromide Emulsion (silver iodide: 6 mol %, mean grain size: 0.85 μm) | 1.6 g/m$^2$ as Ag |
| Sensitizing Dye III | 4.0 × 10$^{-4}$ mol per mol of silver halide |
| Sensitizing Dye IV | 1.6 × 10$^{-4}$ mol per mol of silver halide |
| Coupler EX - 9 | 0.020 mol per mol of silver halide |
| Coupler EX - 7 | 0.002 mol per mol of silver halide |
| Coupler EX - 8 | 0.001 mol per mol of silver halide |
| Gelatin | 1.8 g/m$^2$ |
| Coupler Dispersing Oil,Oil-1 | 0.45 g/m$^2$ |

-continued

| | |
|---|---|
| Oil-2 | 0.1 g/m$^2$ |
| **Layer 8: 3rd Green-Sensitive Emulsion Layer** | |
| Silver Iodobromide Emulsion (silver iodide: 10 mol %, mean grain size: 1,5 μm) | 2.1 g/m$^2$ as Ag |
| Sensitizing Dye III | 3.0 × 10$^{-4}$ mol per mol of silver halide |
| Sensitizing Dye IV | 1.2 × 10$^{-4}$ mol per mol of silver halide |
| Coupler EX - 9 | 0.009 mol per mol of silver halide |
| Coupler EX - 2 | 0.001 mol per mol of silver halide |
| Gelatin | 2.1 g/m$^2$ |
| Coupler Dispersing Oil,Oil-1 | 0.7 g/m$^2$ |
| Coupler Dispersing Oil,Oil-2 | 0.1 g/m$^2$ |
| **Layer 9: Yellow Filter Layer** | |
| Gelatin layer formed by coating an emulsified dispersion of yellow colloid silver and 2,5-di-t-pentadecylhydroquinone in an aqueous gelatin solution. | |
| Gelatin | 0.9 g/m$^2$ |
| **Layer 10: 1st Blue-Sensitive Emulsion Layer** | |
| Silver Iodobromide Emulsion (silver iodide: 6 mol %, mean grain size: 0.6 μm) | 0.4 g/m$^2$ as Ag |
| Coupler EX - 10 | 0.27 mol per mol of silver halide |
| Coupler EX - 11 | 0.005 mol per mol of silver halide |
| Gelatin | 1.3 g/m$^2$ |
| Coupler Dispersing Oil,Oil-1 | 0.3 g/m$^2$ |
| **Layer 11: 2nd Blue-Sensitive Emulsion Layer** | |
| Silver Iodobromide Emulsion (silver iodide: 10 mol %, mean grain size: 1.0 μm) | 0.6 g/m$^2$ as Ag |
| Coupler EX - 10 | 0.045 mol per mol of silver halide |
| Gelatin | 0.5 g/m$^2$ |
| Coupler Dispersing Oil,Oil-1 | 0.05 g/m$^2$ |
| **Layer 12: 3rd Blue-Sensitive Emulsion Layer** | |
| Silver Iodobromide Emulsion (silver iodide: 10 mol %, mean grain size: 1.8 μm) | 0.8 g/m$^2$ as Ag |
| Sensitizing Dye V | 2.0 × 10$^{-4}$ per mol of silver halide |
| Coupler EX - 10 | 0.036 mol per mol of silver halide |
| Gelatin | 0.4 g/m$^2$ |
| Coupler Dispersing Oil,Oil-1 | 0.1 g/m$^2$ |
| **Layer 13: 1st Protective Layer** | |
| Gelatin Layer | |
| Gelatin | 0.7 g/m$^2$ |
| **Layer 14: 2nd Protective Layer** | |
| Gelatin Layer containing silver iodobromide (silver iodide: 1 mol %, mean grain size: 0.07 μm) and polymethyl methacrylate particles (diameter: about 1.5 μm). | |

Each layer further contains Gelation Hardening Agent H and a surface active agent in addition to the above-described components.

The compounds used for preparing the above samples are shown below. However, Sensitizing Dyes I and II, Coupler EX - 1, Oil - 1, and Gelatin Hardening Agent H - 1 are same as in Example 1.

Sensitizing Dye III: Anhydro-9-ethyl-5,5′-dichloro-3,3′-di-(γ-sulfopropyl)oxacarbocyanine Sodium Salt.

Sensitizing Dye IV: Anhydro-5,6,5′,6′-tetrachloro-1,1′-diethyl-3,3′-di-{β{β-(γ-sulfopropoxy)ethoxy}ethyl}-imidazolocarbocyanine Hydroxide Sodium Salt.

Sensitizing Dye V: Anhydro-5,5′-dichloro-3,3′-di-(γ-sulfobutyl)thiacyanineethyl Ammonium Salt.

Oil-2:
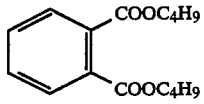
Coupler EX-2:
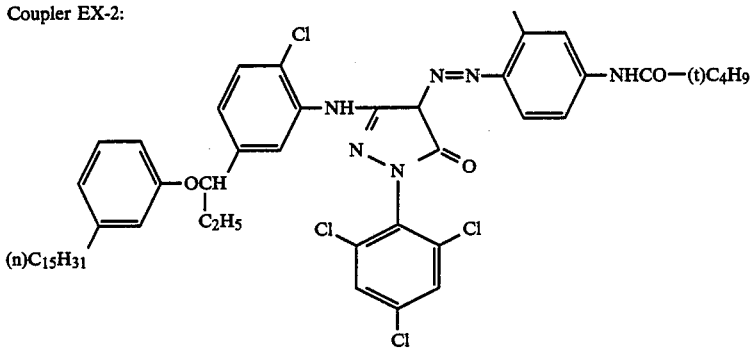
Coupler EX-2
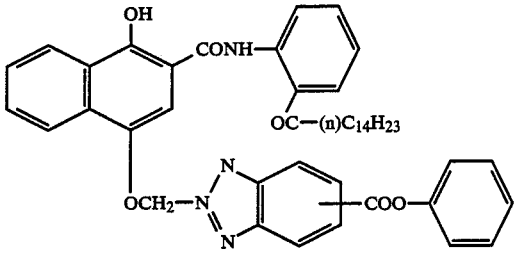
Coupler EX-3
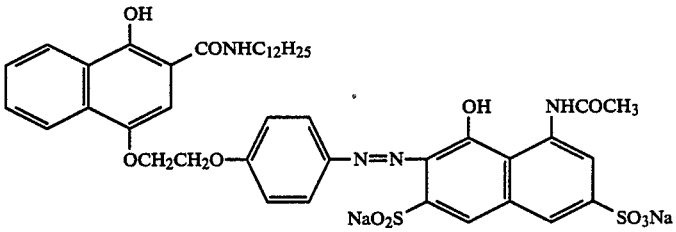
Coupler EX-4
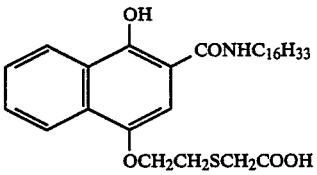
Coupler EX-5
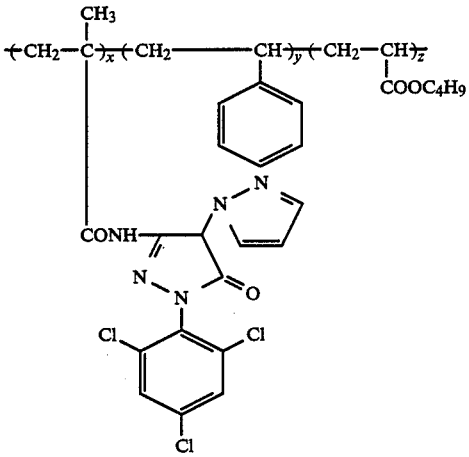
Coupler EX-6

-continued
x/y + z = 1
y/z = 1 } molar ratio  molecular weight 40,000
Coupler EX-7
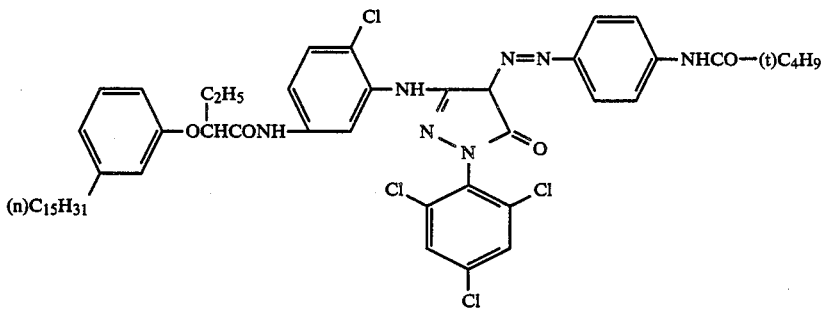
Coupler EX-8
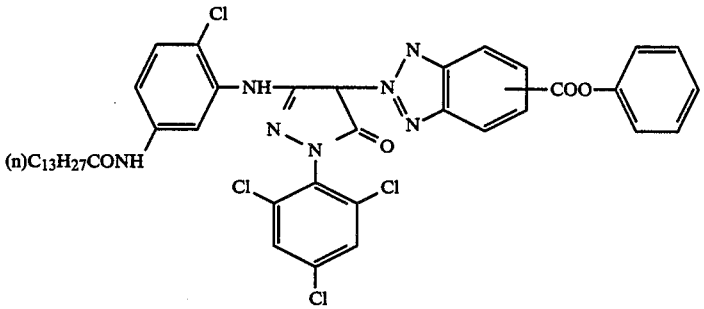
Coupler EX-9
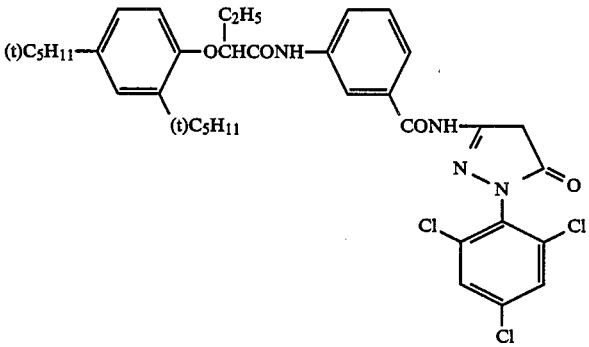
Coupler EX-10
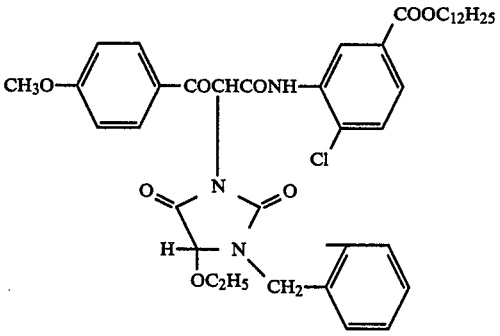
Coupler EX-11
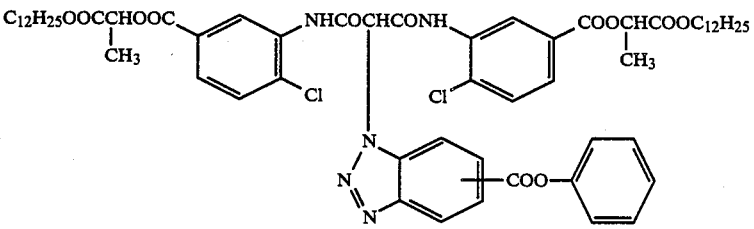

Samples 201 to 207 thus obtained were subjected o the same test as in Example 1 and the results obtained re shown in Table 6 below.

TABLE 6

| Sample | Relative Cyan Coloring Density | Fluorescent Lamp (10,000 lux) for 7 days | |
|---|---|---|---|
| | | $D_B$*1 | Color Image Residue (%)*2 |
| 201 (Comparison) | 0.75 | 0.03 | 95 |
| 202 (Comparison) | 0.99 | 0.10 | 99 |
| 203 (Invention) | 0.99 | 0.04 | 100 |
| 204 (Invention) | 1.00 | 0.02 | 99 |
| 205 (Comparison) | 0.99 | 0.09 | 99 |
| 206 (Invention) | 1.00 | 0.03 | 99 |
| 207 (Invention) | 0.99 | 0.03 | 100 |

*1Exposed from the support side.
*2Color image residue at the portion having a cyan initial density of 1.5.

From the results shown in Table 6, it can be seen hat the Samples of this invention (203, 204, 206, and 207) are excellent because they do not indicate a reduction in cyan color density even when processed in a fatigued leach liquid. Furthermore, the samples of the present invention show less stain even after light exposure for a long period of time.

EXAMPLE 3

Samples 301 to 307 of color photographic materials were prepared in the same manner as Example 1 except that couplers and compounds shown in Table 7 were used and Coupler Dispersing Oil (Oil-1) in layher 1 was used in an amount of 0.5 g/m$^2$.

TABLE 7

| Sample | Coupler (Amount)*1 | Compound (Amount)*2 |
|---|---|---|
| 301 | EX - 1 (0.05) | — |
| 302 | I - 3 (0.05) | — |
| 303 | I - 3 (0.05) | (1) (0.3) |
| 304 | I - 3 (0.05) | (20) (0.3) |
| 305 | I - 13 (0.05) | — |
| 306 | I - 13 (0.05) | (7) (0.3) |
| 307 | I - 13 (0.05) | (21) (0.3) |

*1Mol amount per mol of silver
*2Mol amount per mol of coupler

Relative Cyan Coloring Density obtained in the same manner as in Example 1 are shown in Table 8 below.

TABLE 8

| Sample | Relative Cyan Coloring Density |
|---|---|
| 301 (Comparison) | 0.65 |
| 302 (Comparison) | 0.99 |
| 303 (Invention) | 1.00 |
| 304 (Invention) | 1.00 |
| 305 (Comparison) | 1.00 |
| 306 (Invention) | 0.99 |
| 307 (Invention) | 1.00 |

From the results shown in Table 8 above, it can be seen that Samples (302 to 307) which use the cyan coupler defined in this invention show almost no reduction in color density even when processed in the fatigued bleach liquid. However, Sample (301) using a comparison cyan coupler shows a reduction in color density.

Samples 301 to 307 which were processed in Processing Step (A) were then subjected to a color image stability test in the same manner as in Example 1. The results obtained are shown in Table 9 below.

TABLE 9

| Sample | Fluorescent Lamp (10,000 lux.) Exposure for 7 Days | |
|---|---|---|
| | $D_B$ | Color Image Residue (%) |
| 301 (Comparison) | 0.04 | 88 |
| 302 (Comparison) | 0.11 | 99 |
| 303 (Invention) | 0.03 | 96 |
| 304 (Invention) | 0.03 | 98 |
| 305 (Comparison) | 0.10 | 99 |
| 306 (Invention) | 0.03 | 98 |
| 307 (Invention) | 0.04 | 97 |

From the results shown in Table 9. it can be seen that Comparison Samples 302 and 305 show a large amount of yellow stain as a result of the light exposure. In contrast. Samples 303, 304, 306, and 307 of this invention which contain the compound of this invention show a very small amount of yellow stain.

From the results described above. it becomes clear that the samples based on this invention are excellent and they do not indicate reduction of cyan color density even when processed in a fatigued bleach liquid. In addition, the samples of the present invention indicate less formation of yellow stain even after light exposure for a long period of time.

EXAMPLE 4

Multilayer color photographic materials 401 to 407 were prepared in the same manner as in Example 2 except that the couplers and the compounds (defined in the present invention) shown in Tables 10 and 11 were used in layers 3 and 4, respectively.

TABLE 10

| Sample | Coupler (Amount) | Compound (Amount) |
|---|---|---|
| 401 | EX-3(0.002),EX-4(0.002),EX-1(0.05) | — |
| 402 | EX-3(0.002),EX-4(0.002),I-3(0.05) | — |
| 403 | EX-3(0.002),EX-4(0.002),I-3(0.05) | (17) (0.2) |
| 404 | EX-3(0.002),EX-4(0.002),I-3(0.05) | (17) (0.2) |
| 405 | EX-3(0.002),EX-4(0.002),I-13(0.05) | — |
| 406 | EX-3(0.002),EX-4(0.002),I-13(0.05) | (30) (0.2) |
| 407 | EX-3(0.002),EX-4(0.002),I-13(0.05) | (33) (0.2) |

TABLE 11

| Sample | Coupler (Amount) | Compound (Amount) |
|---|---|---|
| 401 | EX-5 (0.02) | — |
| 402 | I-18 (0.02) | — |
| 403 | I-18 (0.02) | — |
| 404 | I-18 (0.02) | (17) (0.2) |
| 405 | I-14 (0.02) | — |
| 406 | I-14 (0.02) | — |
| 407 | I-14 (0.02) | — |

Samples 401 to 407 thus obtained were subjected to the same test as in Example 1 and the results obtained are shown in Table 12 below.

TABLE 12

| Sample | Relative Cyan Coloring Density | Fluorescent Lamp (10,000 lux.) for 7 Days | |
|---|---|---|---|
| | | $D_B$ | Color Image Residue (%) |
| 401 (Comparison) | 0.74 | 0.04 | 95 |
| 402 (Comparison) | 1.00 | 0.11 | 99 |
| 403 (Invention) | 0.99 | 0.04 | 98 |
| 404 (Invention) | 0.98 | 0.03 | 97 |
| 405 (Comparison) | 0.98 | 0.10 | 98 |
| 406 (Invention) | 0.99 | 0.04 | 97 |

TABLE 12-continued

| Sample | Relative Cyan Coloring Density | Fluorescent Lamp (10,000 lux.) for 7 Days | |
|---|---|---|---|
| | | $D_B$ | Color Image Residue (%) |
| 407 (Invention) | 0.99 | 0.04 | 98 |

From the results shown in Table 12, it can be seen that Samples of this invention (403, 404, 406 and 407) are excellent and they do not indicate a reduction of cyan coloring density even when processed in a fatigued bleach liquid. In addition, the samples of the present invention indicate less stain even after light exposure for a long period of time.

While the invention has been described in detail and with reference to specific embodiments thereof, it will be apparent to one skilled in the art that various changes and modifications can be made therein without departing from the spirit and scope thereof.

What is claimed is:

1. A silver halide color photographic light-sensitive material having at least one light-sensitive silver halide emulsion layer on a support, wherein said silver halide color photographic light-sensitive material contains (i) at least one cyan dye-forming coupler selected from the group consisting of compounds represented by formula (I) and a compound having at least two coupler residues derived from the compound represented by formula (I) and ii) at least one compound selected from the group consisting of compounds represented by formulas (II), (III), (IV), (V), (VI), (VII), (VIII) and a compound having at least two residues derived from at least one compound selected from the group consisting of compounds represented by formulas (VI), (VII) and (VIII);

(I)

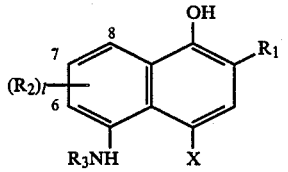

wherein $R_1$ represents $—CONR_6R_7$, $—NHCOR_6$, $—NHCOOR_8$, $—NHSO_2R_8$, $—NHCONR_6R_7$, or $—NHSO_2NR_6R_7$, wherein $R_6$ and $R_7$ each represents a hydrogen atom, an aliphatic group, an aromatic group, or a heterocyclic group and $R_8$ represents an aliphatic group, an aromatic group, or a heterocyclic group, or $R_6$ and $R_7$ in

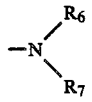

combine with each other to form a nitrogen-containing heterocyclic ring, $R_2$ represents a group capable of being substituted to a naphthalene ring; l represents an integer of from 0 to 3; $R_3$ represents a mono-valent organic group; and X represents a hydrogen atom or a group capable of releasing by a coupling reaction with the oxidation product of an aromatic primary amine developing agent, when l is 2 or 3, the $R_2$ groups are the same or different, or they combine with each other to form a ring when they are adjacent to each other, or $R_2$ and $R_3$ groups when $R_2$ is present at 6-position or $R_3$ and X groups combine with each other to form a ring (II)

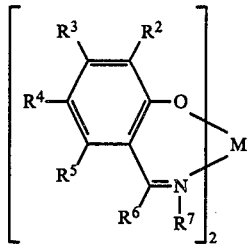

(III)

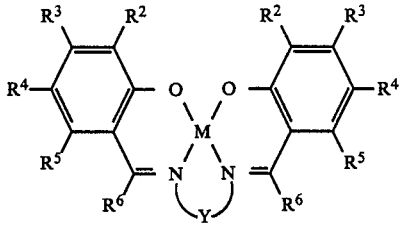

(IV)

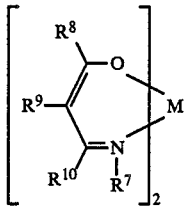

(V)

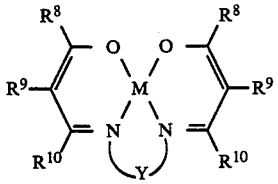

wherein M represents Cu, Co, Ni, Pd, or Pt; $R^2$, $R^3$, $R^4$, and $R^5$ each represents a hydrogen atom, a halogen atom, a hydroxy group, a cyano group; a substituted or unsubstituted alkyl group, aryl group, cycloalkyl group, or heterocyclic group bonded to the carbon atom of the benzene ring directly or through a divalent linkage group; or non-metallic atomic group necessary for forming a 6-membered ring by the combination of said $R^2$ and $R^3$, said $R^3$ and $R^4$, or said $R^4$ and $R^5$ with each other, $R^6$, $R^9$, and $R^{10}$ each represents a hydrogen atom, a substituted or unsubstituted alkyl group or aryl group; $R^7$ represents a hydrogen atom, a substituted or unsubstituted alkyl group or aryl group, or a hydroxy group; $R^8$ represents a substituted or unsubstituted alkyl group, or aryl group, or a non-metallic atomic group necessary for forming a 5-membered to 8-membered ring by the combination of said $R^8$ and $R^9$ or $R^9$ and $R^{10}$ with each other; and Y represents a non-metallic atomic group necessary for forming a 5-membered ring or a 6-membered ring:

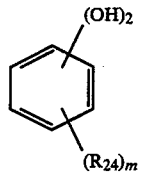

(VI)

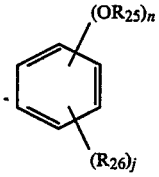

(VII)

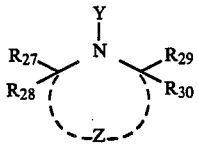

(VIII)

wherein $R_{24}$ represents an aliphatic group, an aromatic group, a heterocyclic group, an aliphatic oxy group, an aromatic oxy group, an aliphatic thio group, an aromatic thio group, an aliphatic carbonamido group, an aromatic carbonamido group, an aliphatic sulfonamido group, an aromatic sulfonamido group, a mono-substituted or disubstituted amino group with aliphatic or aromatic groups, and m represents an integer of 1 to 4 when m is plural, $R_{24}$ groups are the same or different or combine with each other to form a ring when they are adjacent to each other, the two hydroxy groups are para-position or ortho-position relative to each other, $R_{25}$ represents an aliphatic group, an aromatic group, a heterocyclic group, or a substituted silyl group, $R_{26}$ has the same significance as defined above for $R_{24}$ in formula (VI); n represents an integer of 1 to 3; and j represents an integer of 0 to 5, the sum of n and j being 6 or less; when n is plural, said $OR_{25}$ groups are the same or different; when said j is plural, said $R_{26}$ groups are the same or different, or when two $OR_{25}$ groups, said two $R_{26}$ groups, or said $OR_{25}$ and $R_{26}$ are in an ortho-position relative to each other, they are not combined or combined with each other to form a ring; $R_{27}$, $R_{28}$, $R_{29}$, and $R_{30}$ each represents a hydrogen atom or an aliphatic group; Y represents a hydrogen atom, an aliphatic group, an acyl group, an aliphatic sulfonyl group, an aromatic sulfonyl group, an aliphatic sulfinyl group, an aromatic sulfinyl group, an aliphatic oxycarbonyl group, an aromatic oxycarbonyl group, an oxyradical group, or a hydroxy group; and Z represents a non-metallic group necessary for forming a 5-membered to 7-membered ring with

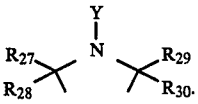

2. The silver halide color photographic light-sensitive material as in claim 1, wherein $R_2$ represents a halogen atom, a hydroxy gorup, $—NR'_6R'_7$, a carboxy group, a sulfonic acid group, a cyano group, an aliphatic group, an aromatic group, a heterocyclic group, $—NHCOR'_6$, $—NHSO_2R'_6$, $—CONR'_6R'_7$, $—SO_2NR'_6R'_7$, $—NHCONR'_6R'_7$, $—COR'_6$, $—OCOR'_6$, $—OR'_8$, $—SR'_8$, $—SO_2R'_8$, $—NHSO_2NR'_6R'_7$, a nitro group, an acid imido group, wherein $R'_6$, $R'_7$ and $R'_8$ each represents an aliphatic group, an aromatic group, and a heterocyclic group or $R'_6$ and $R'_7$ each is a hydrogen atom, or $R'_6$ and $R'_7$ combine with each other to form a nitrogen-containing heterocyclic ring.

3. The silver halide color photographic light-sensitive material as in claim 1, wherein $R_3$ represents a group represented by formula (IX)

$R_9(Y_1)_n$- (IX)

wherein $Y_1$ represents >NH, >CO, or $>SO_2$, n represents 0 or 1; and $R_9$ represents a hydrogen atom, an aliphatic group having 1 to 30 carbon atoms, an aromatic group having 6 to 30 carbon atoms, a heterocyclic group having 2 to 30 carbon atoms, 13 $OR_{10}$,—$COR_{10}$,

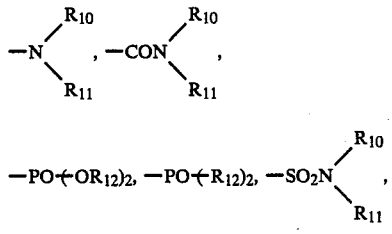

$—CO_2R_{12}$, $—SO_2R_{12}$, or $—SO_2OR_{12}$ wherein $R_{10}$, $R_{11}$, and $R_{12}$ each represents an aliphatic group, an aromatic group, and a heterocyclic group, or $R_{10}$, $R_{11}$ and $R_{12}$ each is a hydrogen atom, or $R_{10}$ and $R_{11}$ combine with each other to form a nitrogen-containing heterocyclic ring.

4. The silver halide color photographic light sensitive material as in claim 1, wherein X in formula (I) represents a hydrogen atom or a coupling releasing group (including releasing atom) selected from the group consisting of a halogen atom, $—OR_{13}$, $—SR_{13}$,

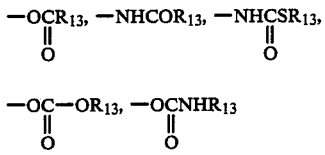

(wherein $R_{13}$ represents an aliphatic group having from 1 to 30 arbon atoms, an aromatic group having from 6 to 30 carbon atoms, or a heterocyclic group having from 2 to 30 carbon atoms), an aromatic azo group having from 6 to 30 carbon atoms, a heterocyclic group having from 2 to 30 carbon atoms bonded to the coupling active position of the coupler by a nitrogen atom.

5. The silver halide color photographic light sensitive material as in claim 1, wherein said divalent linkage group is a group selected from the group consisting of —O—, —S—, —NH—, an oxycarbonyl group, a carbonyl group, —HNCO—, $—HNSO_2—$, a carbonylamino group, a sulfonyl group and a carbonyloxy group.

6. The silver halide color photographic light sensitive material as in claim 1, wherein said non-metallic atomic group shown by Y in formulas (III) or (v) nessary for forming a 5- or 6-membered ring is selected from the group consisting of (a), (b), (c), (d) or (e)

(a)

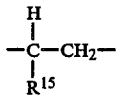

(b)

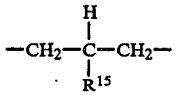

(c)

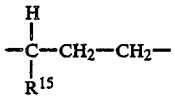

(d)

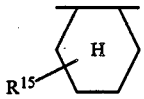

(e)

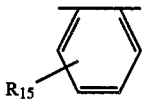

wherein $R^{15}$ represents a hydrogen atom or a substituted or unsubstituted alkyl group.

7. The silver halide color photographic light sensitive material as in claim 1, wherein said compounds represented by formulae (II), (III), (IV) or (V) are those represented by formulae (IIa), (IIb), (IIIa), (IVa) (IVb) or (Va)

(IIa)

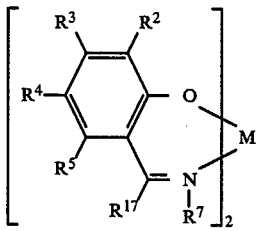

(IIb)

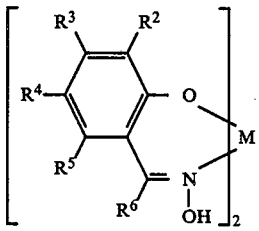

(IIIa)

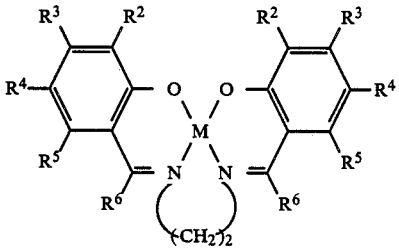

-continued (IVa)

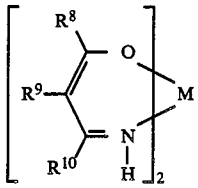

wherein $R^2$ to $R^{10}$ and M are defined in claim 1 in the definition for formulae (II) to (V), n represents 2 or 3, and $R^{17}$ represents a substituted or unsubstituted alkyl group or aryl group.

8. The silver halide color photographic light sensitive material as in claim 1, wherein said compound represented by formula (VI) is a compound represented by formula (VI-a)

(VI-a)

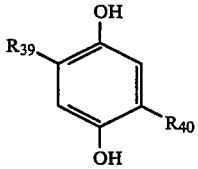

wherein $R_{39}$ and $R_{40}$ each represents an aliphatic group.

9. The silver halide color photographic light sensitive material as in claim 1, wherein said compound represented by formula (VII) is a compound represented by formulae (VII-a), (VII-b), (VII-c), (VII-d) or (VII-e)

(VIIa)

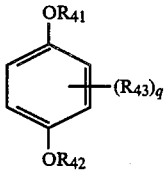

(VIIb)

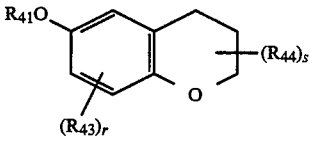

(VIIc)

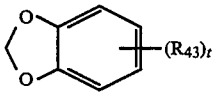

(VIId)

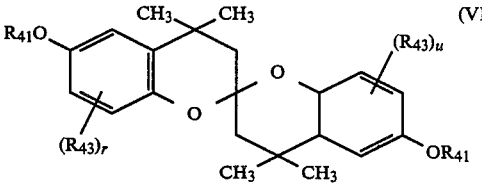

(VIIe)

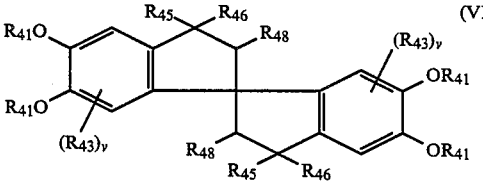

wherein $R_{41}$ and $R_{42}$ each represents an aliphatic group having 1 to 30 carbon atoms or a substituted silyl group having 3 to 30 carbon atoms, $R_{43}$ represents an aliphatic group having 1 to 30 carbon atoms, an aliphatic oxy group having 1 to 30 carbon atoms, an aliphatic thio group having 1 to 30 carbon atoms, or a carbon amido group having 2 to 30 carbon atoms; $R_{44}$ represents an aliphatic group having 1 to 30 carbon atoms or an aromatic group having 6 to 30 carbon atoms; $R_{45}$, $R_{46}$, $R_{47}$, and $R_{48}$ each represents a hydrogen atom or an aliphatic group having 1 to 12 carbon atoms; q represents an integer of 1 to 4; r represents an integer of 0 to 3; s represents an integer of 0 to 6; t represents an integer of 1 to 4; u represents an integer of 0 to 3; and v represents an integer of 0 to 2.

10. The silver halide color photographic light sensitive material as in claim 1, wherein said compound represented by formula (VIII) and derivatives thereof are compounds represented by formulae (VIII-a) and a bis-, tris-, or tetrakis compounds and a polymer which are derived by combining the compounds at Y or V;

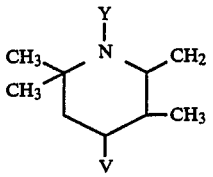

wherein Y has the same definition as in claim 1 and V represents an acyloxy group having from 2 to 30 carbon atoms, or an aliphatic and aromatic carbonamide group having from 2 to 30 carbon atoms.

11. The silver halide color photographic light sensitive material as in claim 1, wherein said compound of (ii) is a compound which is derived by combining two or more residues of at least two different compounds selected from the group consisting of compounds represented by formulae (VI), (VII) or (VIII).

12. The silver halide color photographic light sensitive material as in claim 1, wherein the total amount of a cyan coupler(s) is from 0.002 to 0.3 mol per mol of the light sensitive silver halide in the silver halide emulsion layer, wherein the amount of a cyan coupler other than the cyan coupler of (i) is not more than 40 mol %.

13. The silver halide color photographic light sensitive material as in claim 1, wherein the amount of the compound of (ii) is from 0.01 to 1 mol per mol of the cyan coupler of (i).

14. The silver halide color photographic light sensitive material as in claim 1, wherein said cyan coupler of (i) is incorporated to the light-sensitive silver halide emulsion layer or a layer adjacent thereto.

15. The silver halide color photographic light sensitive material as in claim 14, wherein said light-sensitive silver halide emulsion layer is red-sensitive.

16. The silver halide color photographic light sensitive material as in claim 1, wherein said compound of (ii) is incorporated to the same layer containing the cyan coupler of (i) or to a layer adjacent thereto.

17. The silver halide color photographic light sensitive material as in claim 1, wherein said compound of (i) having at least two coupler residues is in a form selected from the group consisting of a bis-, tris- and tetrakis compounds, an oligomer and a polymer.

18. The silver halide color photographic light sensitive material as in claim 1, wherein said compound of (ii) having at least two residues is in a form selected from the group consisting of a bis-, tris- and tetrakis compound, an oligomer and a polymer.

19. The silver halide color photographic light sensitive material as in claim 1, wherein the substituent which can be substituted to any one of groups contained in compounds (i) and (ii) is a substituent selected from the group consisting of a halogen atom, a nitro group, a cyano group, an acyl group, an alyloxy group, an alkyl- or arylsulphonyl group, a hydroxy group, an amido group, an amino group including $NH_2$ and mono- and disubstituted with an aliphatic or aromatic group, an alkyl group, an alkenyl group and a aryl group.

20. A method for producing a color image which comprises (1) developing an exposed silver halide color photographic light-sensitive material using developing solution containing an aromatic primary amino-developing agent, (2) bleaching and then fixing, or blixing, said light-sensitive material which comprises at least one light-sensitive silver halide emulsion layer on a support, wherein said silver halide color photographic light-sensitive material contains (i) at least one cyan dye-forming coupler selected from the group consisting of compounds represented by following formula (I) and a compound having at least two coupler residues derived from the compound represented by formula (I), and (ii) at least one compound selected from the group consisting of compounds represented by formulas (II), (III), (IV), (V), (VI), (VII), (VIII) and a compound having at least two residues derived from at least one compound selected from the group consisting of compounds represented by formulas (VI), (VII), and (VIII):

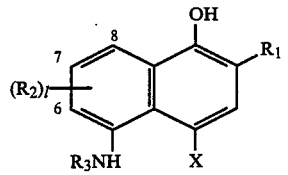

(I)

wherein $R_1$ represents $-CONR_6R_7$, $-NHCOR_6$, $-NHCOOR_8$, $-NHSO_2R_8$, $-NHCONR_6R_7$, or $-NHSO_2NR_6R_7$, wherein $R_6$ and $R_7$ each represents a hydrogen atom, an aliphatic group, an aromatic group, or a heterocyclic group and $R_8$ represents an aliphatic group, an aromatic group, or a heterocyclic group, or $R_6$ and $R_7$ in

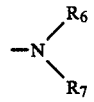

combine with each other to form a nitrogen-containing heterocyclic ring, $R_2$ represents a group capable of being substituted to a naphthalene ring; l represents an integer of from 0 to 3; $R_3$ represents a mono-valent organic group; and X represents a hydrogen atom or a group capable of releasing by a coupling reaction with the oxidation product of an aromatic primary amine developing agent, when l is 2 or 3, the $R_2$ groups are the same or different, or they combine with each other to form a ring when they are adjacent to each other, or $R_2$ and $R_3$ groups when $R_2$ is present at the 6-position or $R_3$ and X groups combine with each other to form a ring (II)

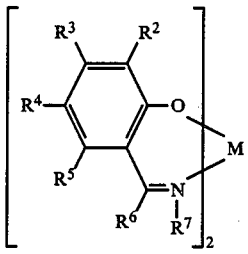

(III)

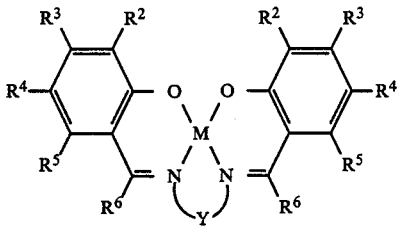

(IV)

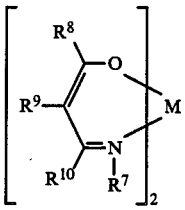

(V)

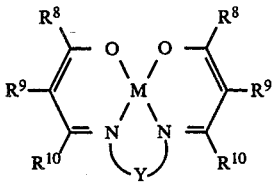

wherein M represent Cu, Co, Ni, Pd, or Pt; $R^2$, $R^3$, $R^4$, and $R^5$ each represents a hydrogen atom, a halogen atom, a hydroxy group, a cyano group; a substituted or unsubstituted alkyl group, aryl group, cycloalkyl group, or heterocyclic group bonded to the carbon atom of the benzene ring directly or through a divalent linkage group; or a non-metallic atomic group necessary for forming a 6-membered ring by the combinaton of said $R^2$ and $R^3$, said $R^3$ and $R^4$, or said $R^4$ and $R_5$ with each other, $R^6$ $R^9$, and $R^{10}$ each represents a hydrogen atom, a substituted or unsubstituted alkyl group or aryl group; $R^7$ represents a hydrogen atom, a substituted or unsubstituted alkyl group or aryl group, or a hydroxy group; $R^8$ represents a substituted or unsubstituted alkyl group, or aryl group, or a non-metallic atomic group necessary for forming a 5-membered to 8-membered ring by the combination of said $R^8$ and $R^9$ or $R^9$ and $R^{10}$ with each other; and Y represents a non-metallic atomic group necessary for forming a 5-membered ring or a 6-membered ring:

(VI)

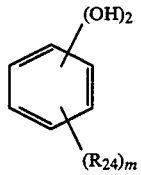

(VII)

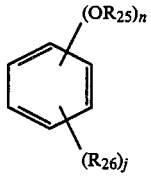

(VIII)

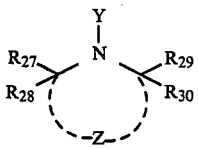

wherein $R_{24}$ represents an aliphatic group, an aromatic group, a heterocyclic group, an aliphatic oxy group, an aromatic oxy group, an aliphatic thio group, an aromatic thio group, an aliphatic carbonamido group, an aromatic carbonamido group, an aliphatic sulfonamido group, an aromatic sulfonamido group, a mono-substituted or disubstituted amino group with an aliphatic or aromatic groups and m represents an integer of 1 to 4 when m is plural, $R_{24}$ groups are the same or different or combine with each other to form a ring when they are adjacent to each other, the two hydroxy groups are para-position or ortho-position relative to each other, $R_{25}$ represents an aliphatic group, an aromatic group, a heterocyclic group, or a substituted silyl group, $R_{26}$ has the same significance as defined above for $R_{24}$ in formula (VI); n represents a integer of 1 to 3; and j represents an integer of 0 to 5, the sum of n and j being 6 or less; when n is plural, said $OR_{25}$ groups are the same or different; when said j is plural, said $R_{26}$ groups are the same or different, or when two $OR_{25}$ groups, said two $R_{26}$ groups, or said $OR_{25}$ and $R_{26}$ are in an orthoposition relative to each other, they are not combined or combined with each other to form a ring; $R_{27}$, $R_{28}$, $R_{29}$, and $R_{30}$ each represents a hydrogen atom or an aliphatic group; Y represents a hydrogen atom, an aliphatic group; and acyl group; an aliphatic sulfonyl group, an aromatic sulfonyl group, an aliphatic sulfinyl group, an aromatic sulfinyl group, an aliphatic oxycarbonyl group, an aromatic oxycarbonyl group, an oxyradical group, or a hydroxy group; and Z represents a non-metallic group necessary for forming a 5-membered to 7-membered ring with

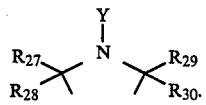

* * * * *